United States Patent
Zhu et al.

(10) Patent No.: US 12,287,028 B2
(45) Date of Patent: Apr. 29, 2025

(54) NONCIRCULAR GEAR PAIR

(71) Applicant: UNIVERSITY OF MARYLAND, BALTIMORE COUNTY, Baltimore, MD (US)

(72) Inventors: Weidong Zhu, Ellicott City, MD (US); Gang Li, Halethorpe, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 70 days.

(21) Appl. No.: 18/048,563

(22) Filed: Oct. 21, 2022

(65) Prior Publication Data

US 2023/0130072 A1   Apr. 27, 2023

Related U.S. Application Data

(60) Provisional application No. 63/270,584, filed on Oct. 22, 2021.

(51) Int. Cl.
*F16H 35/02* (2006.01)
*F16H 35/00* (2006.01)

(52) U.S. Cl.
CPC ....... *F16H 35/02* (2013.01); *F16H 2035/003* (2013.01)

(58) Field of Classification Search
CPC ................ F16H 35/02; F16H 2035/003
See application file for complete search history.

(56) References Cited

U.S. PATENT DOCUMENTS

| 2,302,942 | A | * | 11/1942 | Golber | B23F 15/02 409/130 |
| 2,788,196 | A | * | 4/1957 | Jacobi | B65G 23/00 198/658 |
| 5,545,871 | A | * | 8/1996 | Carr | F16H 35/02 700/162 |
| 6,849,023 | B1 | | 2/2005 | Kerr | |

FOREIGN PATENT DOCUMENTS

GB          2473341 A  *  3/2011  .............. F01C 1/084

OTHER PUBLICATIONS

Bair et al., Mathematical model and characteristic analysis of elliptical gears manufactured by circular-arc shaper cutters. ASME Journal of Mechanical Design 2007, 129(2), 210-217.
(Continued)

*Primary Examiner* — Terence Boes
(74) *Attorney, Agent, or Firm* — Casimir Jones, SC; Brian F. Bradley

(57) ABSTRACT

The present disclosure describes innovations to improve the use of noncircular gear pairs in a transmission, e.g., an infinitely variable transmission. The noncircular gear pair includes a first noncircular gear with a first pitch curve; and a second noncircular gear with a second pitch curve. The first pitch curve includes a plurality of elliptical portions, and a curvature of the first pitch curve is positive along the entire first pitch curve; and wherein the second pitch curve is a conjugate of the first pitch curve.

12 Claims, 10 Drawing Sheets
(8 of 10 Drawing Sheet(s) Filed in Color)

(56) References Cited

OTHER PUBLICATIONS

Bair et al., Tooth profile generation and analysis of oval gears with circular-arc teeth, Mechanism and Machine Theory, 2009, 44, 1306-1317.
Bair. Computer aided design of elliptical gears with circular-arc teeth. Mechanism and Machine Theory, 2004, 39(2), 153-168.
Bair. Computer aided design of elliptical gears. ASME Journal of Mechanical Design. 2002. 124(4), 787-793.
Bair. Computer aided design of nonstandard elliptical gear drives, Journal of Mechanical Engineering Science 216 (2002) 473-483.
Bair. Computerized tooth profile generation of elliptical gears manufactured by shaper cutters, Journal of Materials Processing Technology, 2002, 122, 139-147.
Bayly et al., Stability of Inter-rupted Cutting by Temporal Finite Element Analysis. Asme J. Manuf. Sci. Eng., 2003, 125(2), 220-225.
Benedict et al., Instantaneous coefficients of gear tooth friction. Transactions of the American Society of Lubrication Engineer, 1961, 4(1), 59-70.
Butcher et al., On the Chebyshev Spectral Con-tinuous Time Approximation for Constant and Periodic Delay Differential Equations. Commun. Nonlinear Sci. Numer. Simul., 2011, 16(3), 1541-1554.
Canova et al., On the Control of Engine Start/Stop Dynamics in a Hybrid Electric Vehicle. AMSE J. Dyn. Syst., Meas., Control, 2009. 131(6), p. 061005. 12 pages.
Cao et al., Delay-Dependent Robust Stability of Uncertain Nonlinear Systems With Time Delay. Appl. Math. Comput., 2004, 154(1), 289-297.
Changenet et al., Power loss predictions in geared transmissions using thermal networks—Applications to a 6-speed manual gearbox, ASME Journal Mechanical Design, 2006, 128(3), 618-625.
Chen et al., Efficiency analysis of two degrees of freedom epicyclic gear transmission and experimental validation, Mechanism and Machine Theory, 2015, 87, 115-130.
Chen. Power flow and efficiency analysis of epicyclic gear transmission with split power, Mechanism and Machine Theory, 2013, 59, 96-106.
Da Wen Ge et al., A Review on Continuously Vari-able Transmissions Control. National Conference in Mechanical Engineering Research and Postgraduate Students (NCMER), Pahang, Malaysia, May 26-27, 2010, pp. 543-544.
Davies et al., Complete efficiency analysis of epicyclic gear train with two degrees of freedom. ASME Journal of Mechanical Design, 2012, 134, 071006. 8 pages.
Dooner, Use of noncircular gears to reduce torque and speed fluctuations in rotating shafts, ASME Journal Mechanical Design, 1997, 119(2), 299-306.
Dooner. The Kinematic Geometry of Gearing, Wiley, New York, 2012, pp. 56-63.
Ehsani et al., Hybrid Electric Vehicles: Archi-tecture and Motor Drives. Proc. IEEE, 2007,95(4), 719-728.
Ferguson et al., The design of a stepless transmission using noncircular gears. Mechanism and Machine Theory 1975, 10(6), 467-478.
Figliolini et al., Synthesis of the base curves for N-lobed elliptical gears. ASME Journal of Mechanical Design, 2005, 127 (5), 997-1005.
Figliolini et al., The synthesis of elliptical gears generated by shaper-cutters, ASME Journal of Mechanical Design, 2003, 125(12), 793-801.
Gorla et al., Efficiency Models of Wind Turbines Gear-boxes With Hydrostatic CVT. Balk. J. Mech. Transm., 2011, 1(2), 17-24.
Hsu et al., Applications of the Theory of Impulsive Parametric Excitation and New Treatments of General Parametric Excitation Problems. ASME J. Appl. Mech., 1973, 40(1), pp. 78-86.
Huang et al., Conjugate approach for hypoid gears frictional loss comparison between different roughness patterns under mixed elastohydrodynamic lubrication regime. Tribology International, 2019, 140, 105884. 11 pages.
Insperger et al., Semi-Discretization Method for Delayed Systems. Int. J. Numer. Methods Eng., 2002, 55(5), pp. 503-518.
Khalil. Nonlinear Systems, Prentice Hall, Upper Saddle River, NJ. 2002. TOC only. 5 pages.
Li et al., A function-oriented active form-grinding method for cylindrical gears based on error sensitivity, The International Journal of Advanced Manufacturing Technology, 2017, 92(5-8), 3019-3031.
Li et al., An active ease-off topography modification approach for hypoid pinions based on a modified error sensitivity analysis method. ASME Journal of Mechanical Design, 2019, 141(9), 093302. 12 pages.
Li et al., Design and power loss evaluation of a noncircular gear pair for an infinitely variable transmission. Mechanism and Machine Theory, 2021, 156, 17 pages.
Li et al., Error-sensitivity analysis for hypoid gears using a real tooth surface contact model, Proceedings of the Institution of Mechanical Engineers, Part C: Journal of Mechanical Engineering Science, 2017, 231(3), 1-15.
Li et al., Numerical computing method of noncircular gear tooth profiles generated by shaper cutters. Int J Adv Manuf Technol. 2007, 33: 1098-1105.
Li et al., Prediction of spur gear mechanical power losses using a transient elastohydrodynamic lubrication model. Tribology Transactions, 2010, 53(4), 554-563.
Li et al., Prediction of surface wear of involute gears based on a modified fractal method, ASME Journal of Tribology, 2019, 141(3), 031603. 62 pages.
Li et al., The modeling approach of digital real tooth surfaces of hypoid gears based on non-geometric-feature segmentation and interpolation algorithm, International Journal of Precision Engineering and Manufacturing, 2016, 17(3): 281-292.
Litvin et al., Noncircular Gears: Design and Generation, Cambridge University Press, New York, 2009. TOC only. 8 pages.
Litvin et al., Gear Geometry and Applied Theory, Cambridge University Press, New York, 2004. TOC only. 13 pages.
Liu et al., Flow fluctuation abatement of high-order elliptical gear pump by external noncircular gear drive. Mechanism and Machine Theory, 2019, 134, 338-348.
Manea et al., Theoretical and Experi-mental Studies on Torque Converters. Therm. Sci., 2010; 14(5), pp. 231-245.
Manwell et al., Wind Energy Explained: Theory, Design and Application, Wiley, Hoboken, NJ. 2010. TOC only. 10 pages.
Marques et al., Power loss and load distribution models including frictional effects for spur and helical gears. Mechanism and Machine Theory, 2016, 96, 1-25.
Mondie et al., Exponential Estimates for Retarded Time-Delay Systems: An LMI Approach. IEEE Trans. Autom. Control, 2005, 50(2), pp. 268-273.
Pesgens et al., Control of a Hydraulically Actuated Continuously Variable Transmission. Veh. Syst. Dyn., 2006, 44(5), pp. 387-406.
Pfiffner et al., Fuel-Optimal Control of CVT Powertrains. Control Eng. Pract., 2003, 11(3), pp. 329-336.
Phat et al., Stability of Linear Time-Varying Delay Systems and Applications to Control Problems. J. Comput. Appl. Math., 2006, 194(2), pp. 343-356.
Quintero Riaza et al., The synthesis of an N-lobe noncircular gear using Bézier and B-spline nonparametric curves in the design of its displacement law, ASME Journal of Mechanical Design, 2007, 129(9), 981-985.
Ramirez et al., Exponential Estimates of a Class of Time-Delay Nonlinear Systems With Convex Representations. Int. J. Appl. Math. Comput. Sci., 2015, 25(4), pp. 815-826.
Ross, Fuel efficiency and the physics of automobiles, Contemporary Physics, 1997, 38(6), 381-394.
Ryu et al., CVT Ratio Control With Consideration of CVT System Loss. Int. J. Automot. Technol., 2008, 9(4), pp. 459-465.
Sastry. Nonlinear Systems: Analysis, Stability, and Control, vol. 10,Springer Science & Business Media, New York. 1999, TOC only. 18 pages.
Setlur et al., Nonlinear Control of a Continuously Variable Transmission (CVT). IEEE Trans. Control Syst. Technol., 2003, 11(1), pp. 101-108.

(56) References Cited

OTHER PUBLICATIONS

Sinha et al., Solution and Stability of a Set of Pth Order Linear Differential Equations With Periodic Coefficients Via Chebyshev Polynomials. Math. Probl. Eng., 1996, 2(2), pp. 165-190.
Srivastava et al., A review on belt and chain continuously variable transmissions (CVT): Dynamics and control, Mechanism and Machine Theory, 2009, 44, 19-41.
Sun et al., Challenges and opportunities in automotive transmission control, in: Proceedings of the 2005 American Control Conference, Portland, 2005, pp. 3284-3289.
Velex et al., An analytical approach to tooth friction losses in spur and helical gears—Influence of profile modifications, ASME Journal Mechanical Design, 2009, 131(10), 101008. 10 pages.
Vidyasagar. Nonlinear Systems Analysis, Prentice Hall, Upper Saddle River, NJ. 1993, TOC only. 8 pages.
Waldron et al., Kinematics, Dynamics, and Design of Machinery, 3th Edition, Wiley, New York, 2004. TOC only. 10 pages.
Wang et al., A modified incremental harmonic balance method based on the fast Fourier transform and Broyden's method. Nonlinear Dynamics, 2015, 81, 981-989.
Wang et al., A New Spatial and Temporal Incremental Har-monic Balance Method for Obtaining Steady-State Responses of a One-Dimensional Continuous System. ASME J. Appl. Mech., 2016, 84(1), p. 014501. 18 pages.
Wang et al., Design and Stability Analysis of an Integral Time-Delay Feedback Control Combined With an Open-Loop Control for an Infinitely Variable Transmission System. Journal of Dynamic Systems, Measurement and Control. 2018, 140, 11 pages.
Wang et al., Design, modeling, and experimental validation of a novel infinitely variable transmission based on scotch yoke systems, ASME Journal of Mechanical Design, 2016, 138(1), 015001. 8 pages.
Wang et al., Design, Modeling, and Experimental Validation of a Novel Infinitely Variable Transmission Based on Scotch Yoke Systems. ASME J. Mech. Des., 2015, 138(1), p. 015001. 8 pages.
Wang et al., Design, modeling, and simulation of a geared infinitely variable transmission, ASME Journal of Mechanical Design, 2014, 136(7), 071011. 9 pages.
Wang et al., Dynamic Analysis of a Geared Infinitely Variable Transmission. ASME J. Comput. Nonlinear Dyn., 2016, 12(3), p. 034502. 54 pages.
Xu et al., Prediction of mechanical efficiency of parallel-axis gear pairs, ASME Journal of Mechanical Design, 2007, 129(1), 58-68.
Yildiz et al., Spark-Ignition-Engine Idle Speed Control: An Adaptive Control Approach. IEEE Trans. Control Syst. Technol., 2011, 19(5), pp. 990-1002.
Zheng et al., Synthesis of indexing mechanisms with non-circular gears, Mechanism and Machine Theory, 2016, 105, 108-128.
Zhu et al., Experimental investigation on the efficiency of the pulley-drive CVT. International Journal of Automotive Technology, 2010, 11(2), 257-261.
Zhu et al., Modeling and control of an infinitely variable speed converter, ASME J. Dyn. Sys., Meas, Control. 2014, 136(3): 031015.

\* cited by examiner

NONCIRCULAR GEAR PAIR

CROSS-REFERENCE TO RELATED APPLICATIONS

This application claims priority to and the benefit of U.S. Provisional Patent Application No. 63/270,584 filed Oct. 22, 2021 and is incorporated herein by reference in its entirety for all purposes.

BACKGROUND

Circular or cylindrical gear pairs are used in most gear transmissions for different applications, such as automotive and mining machinery. These gear transmissions are designed to transmit power with constant speed ratios and low power losses using a finite number of gear pairs. The finite number of gear pairs with constant speed ratios limits the range of speed ratios of the gear transmission, which results in low fuel efficiency. Other gear transmissions with continuously variable speed ratios have been developed for power transfer, i.e., continuously variable transmissions (CVTs), and infinitely variable transmissions (IVTs) that can achieve a zero gear ratio. CVTs can achieve a continuous range of speed ratios using friction-based chain-pulley systems that cause slipping power losses in low-speed and high-torque conditions. Due to effects of noncircular gears on speed ratios and torque transfer, IVTs with noncircular gears can operate with a continuously variable speed ratio for desired output speeds. Compared with current friction-based CVTs technologies, IVTs with noncircular gears have obvious advantages in low-speed and high-torque applications. Since asymmetry of a noncircular gear pair can instantaneously change the speed ratio throughout its meshing process, it is used to eliminate speed variations of an IVT. The noncircular gear pair can satisfy specific motion requirements of the displacement or rotational speed of the driven gear. Noncircular gears can also be designed to reduce undesirable speed and torque fluctuations in multi-rotor systems.

Elliptical gears are a common type of noncircular gears, which can be designed with variable speed ratios for arbitrary motion conversion. Tooth surfaces of an elliptical gear pair can properly mesh when elliptical gears rotate about their focal points. Since pitch curves of elliptical gears are ellipses, it is difficult to design and manufacture elliptical gears. While tooth profiles of elliptical gears can be generated based on the conjugate meshing principle, generation motion and cutting kinematics of elliptical gears are challenging for both designers and engineers. Some generation methods of standard and nonstandard involute tooth profiles and circular-arc tooth profiles of elliptical gears were developed by using rack or shaper cutters. Curvature analysis methods were proposed to avoid undercutting conditions of their manufacturing processes. Base curves, pitch curves, and tooth profiles of basic and N-lobed elliptical gears were developed by using conjugate shaper cutters with involute tooth profiles. Others developed a simplified numerical tooth profile generation method of noncircular gears by using a gear shaping process without solving complicated meshing equations. A high-order elliptical gear pump was developed to eliminate flow pulsation. Pitch curves of high-order elliptical gears were designed based on average flow rates of these pumps. An indexing mechanism that comprises noncircular planetary gear drives was proposed to obtain a high contact ratio. Since Bézier curves can be used to identify local geometric features of gear tooth surfaces, a conjugate pitch curve modeling method was developed to define angular coordinates of pitch curves of N-lobed elliptical gears based on Bézier curves. Tooth profiles of noncircular gears are manufactured by hobbing and shaping machine tools with rack and shaper cutters, respectively, which are similar to manufacturing processes of circular gears. Due to complex geometric features of noncircular gears, more analysis of tooth profiles of noncircular gears is required to optimize gear parameters to achieve better meshing performance. Pitch curves must be designed to achieve desired velocity profiles of variable motions of noncircular gear pairs.

Much research has been devoted to pitch curve design and tooth profile manufacturing of noncircular gears. However, smoothness of pitch curves and efficiency of noncircular gears have not been clarified yet. Since noncircular gears rotate with non-uniform speeds, elliptical gears demonstrate particular characteristics of non-smooth pitch curves and low efficiency, which can increase dynamic friction forces and failure rates of gear transmissions. While a previous design of a noncircular gear pair can eliminate speed variations of an IVT, there are cusps between two neighboring lobes of pitch curves of noncircular gears, which reduce smoothness of pitch curves and increase sliding friction forces of tooth profiles. Additionally, it is difficult to manufacture tooth profiles at or near cusps of pitch curves of noncircular gears by rack or shaper cutters. Principal power losses of gear transmissions are caused by sliding friction of meshing gear tooth surfaces, churning of lubrication oil, and friction inside shaft support bearings. Gear meshing power loss has dominant impacts on overall performance of a gear pair in low-speed and high-torque applications.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect, the present disclosure provides a noncircular gear comprising a pitch curve including a plurality of elliptical portions and a plurality of modified transition portions. Each of the plurality of modified transition portions is positioned between adjacent ones of the plurality of elliptical portions.

In some embodiments, the plurality of elliptical portions includes 3, 4, 5, 6, 7, 8, 9, 10, or more elliptical portions.

In some embodiments, the plurality of elliptical portions includes four elliptical portions.

In some embodiments, the plurality of elliptical portions includes six elliptical portions.

In some embodiments, an eccentricity of each of the plurality of elliptical portions is within a range of 0.1 to 0.9.

In some embodiments, the eccentricity of each of the plurality of elliptical portions is within a range of 0.1 to 0.3.

In some embodiments, the eccentricity of each of the plurality of elliptical portions is approximately 0.15.

In some embodiments, a curvature of the pitch curve is positive along the entire pitch curve.

In some embodiments, the pitch curve includes no cusps.

In some embodiments, the noncircular gear is manufacturable with a shaping cutter with a constant radius.

In some embodiments, the noncircular gear includes a plurality of teeth.

In one aspect, the present disclosure provides a noncircular gear pair comprising a first noncircular gear with a first pitch curve, and a second noncircular gear with a second pitch curve. The first pitch curve includes a plurality of elliptical portions, and a curvature of the first pitch curve is positive along the entire first pitch curve. The second pitch curve is a conjugate of the first pitch curve.

In some embodiments, the plurality of elliptical portions includes at least four elliptical portions.

In some embodiments, a transition portion is positioned between each of the plurality of elliptical portions.

In some embodiments, the first noncircular gear includes a first plurality of teeth and the second noncircular gear pair includes a second plurality of teeth.

In some embodiments, the number of the first plurality of teeth is equal to the number of the second plurality of teeth.

In one aspect, the present disclosure provides a transmission assembly comprising: a noncircular gear pair as detailed herein, an input shaft; a secondary shaft; a control shaft; an output shaft; a planetary gear set coupled to the secondary shaft; and a scotch yoke system.

In some embodiments, the transmission assembly further includes a motor coupled to the control shaft.

In one aspect, the present disclosure provides a method of manufacturing a gear. The method comprises: calculating kinematic equations of the gear pair; generating a high-order non-circular pitch curve based on the kinematic equations; modifying the pitch curve to remove cusp to create a modified pitch curve; and generating a tooth profile on the modified pitch curve. The method further includes cutting the tooth profile with a shaping cutter.

In some embodiments, the gear pair are noncircular.

This work presents novel modified high-order elliptical pitch curves of noncircular gears for a transmission (e.g., an IVT) to improve smoothness of pitch curves and manufacturability of noncircular gears. The modified high-order elliptical pitch curves are designed based on kinematic equations of the IVT. Although reference is made for the noncircular gear pair being used for an infinitely variable transmission, the person skilled in the art will understand that the noncircular gear pair is not limited to same. Power loss of the noncircular gear pair is evaluated by incorporating load-dependent friction forces and sliding velocities of meshing tooth surfaces. A power loss evaluation method of noncircular gears is developed for changing speed and load conditions. Particular meshing characteristics of tooth surfaces of noncircular gears with modified high-order elliptical pitch curves are determined, and time-varying load distribution of tooth surfaces of noncircular gears is considered in the calculation process of tooth surface friction forces. The key merits of the proposed noncircular gear design method with a modified high-order elliptical pitch curve are that (1) the resulting IVT can improve its meshing performance of with large speed variation that is induced by the variable input speed; and (2) power loss evaluation of noncircular gears with modified high-order elliptical pitch curves can reduce their dynamic friction forces.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying figures are provided by way of illustration and not by way of limitation.

DETAILED DESCRIPTION

Figure 1:
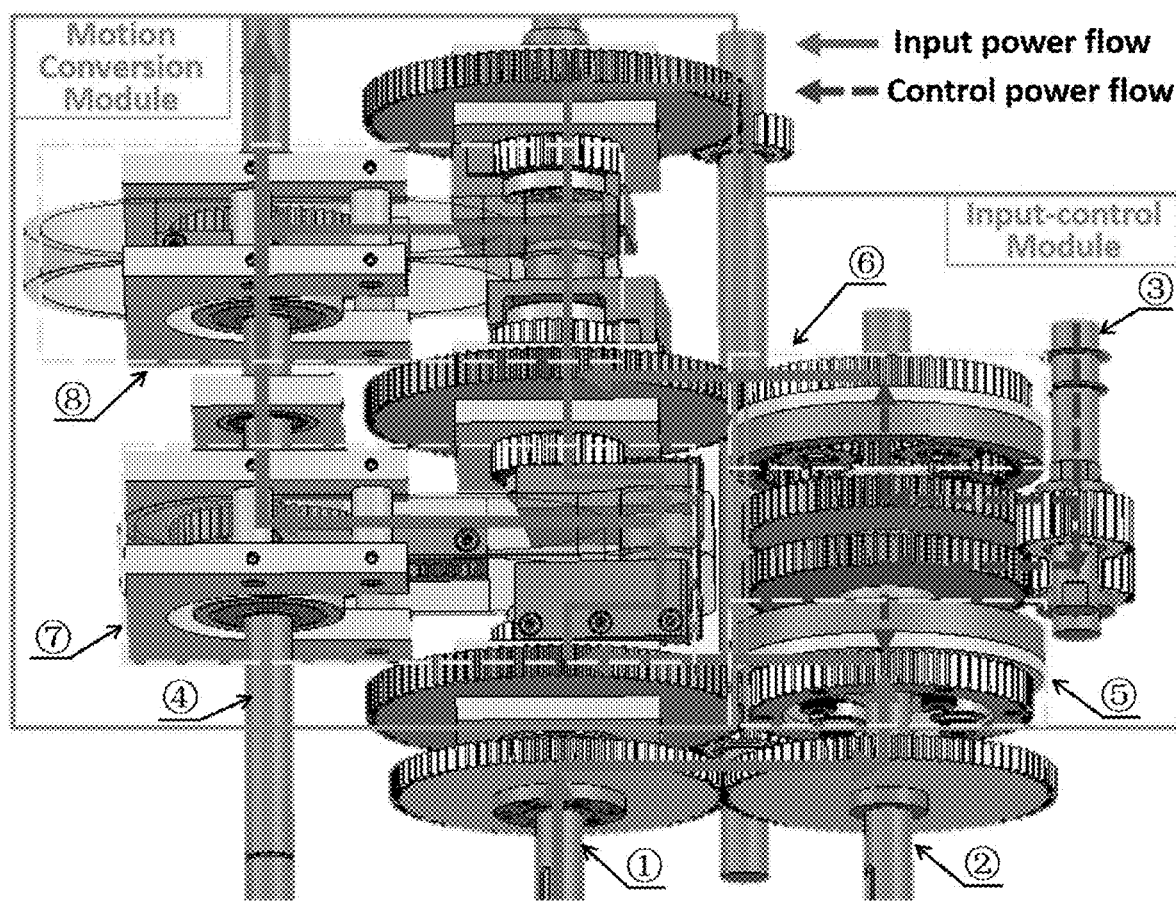
FIG. 1 is a schematic of an infinitely variable transmission.

Section headings as used in this section and the entire disclosure herein are merely for organizational purposes and are not intended to be limiting.

All publications, patent applications, patents and other references mentioned herein are incorporated by reference in their entirety.

A noncircular gear design method is provided herein and is based on a modified high-order elliptical pitch curve for an infinitely variable transmission (IVT). Power loss evaluation of a noncircular gear pair is also presented. Modified high-order elliptical pitch curves of noncircular gears are developed by using kinematic equations of the IVT to eliminate cusps between every two neighboring lobes of pitch curves, and improve smoothness of pitch curves and manufacturability of the noncircular gear pair. A power loss evaluation method is developed for the noncircular gear pair by calculating sliding friction power loss of meshing tooth surfaces. The time-varying friction force of every contact position on meshing tooth surfaces of the noncircular gear pair is calculated by using their variable coefficients of friction and sliding velocities. As detailed herein, the instantaneous sliding friction power loss of the noncircular gear pair is calculated based on time-varying friction forces and sliding velocities along contact paths of tooth profiles of the noncircular gear pair.

1. Definitions

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. Recitation of ranges of values herein are merely intended to serve as a shorthand method of referring individually to each separate value falling within the range, unless otherwise-Indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular.

As used herein, an "elliptical" portion is a portion that is relating to or shaped like an ellipse. An ellipse includes an oval shape, traced by a point moving in a plane so that the sum of its distances from two other points (e.g., the foci) is constant. The elongation of an ellipse is measured by its eccentricity, a number ranging from 0 (e.g., a limiting case of a circle) to 1 (e.g., a limiting case of infinite elongation, a parabola). The midpoint of the line segment joining the foci is called the center of the ellipse. The line through the foci is called the major axis, and the line perpendicular to the major axis and through the center is called the minor axis. It should be appreciated by the person skilled in the art that for the purposes of this description, the eccentricity will be some value greater than zero and less than one.

As used herein, a "lobe" is a roundish or arcuate part of something. In some embodiments, a lobe can include an elliptical portion.

As used herein, a "cusp" corresponds to points with discontinuous curvatures (e.g., a pointed end where two curves meet).

Abbreviations used herein include: coefficient of friction (COF); continuously variable transmission (CVT); input-control module (ICM); infinitely variable transmission (IVT); motion-conversion module (MCM); first, or driven, noncircular gear (NG1); second, or driving, noncircular gear (NG2); planetary gear set (PGS); and scotch yoke system (SYS).

Nomenclature used herein is consistent with "Design and power loss evaluation of a noncircular gear pair for an infinitely variable transmission" Gang Li, Weidong Zhu, Mechanism and Machine Theory 156 (2021) 104137, which is incorporated herein in its entirety.

2. Layout and Kinematic Model of the Infinitely Variable Transmission

The basic principle of the IVT is to mechanically transmit a variable input speed to a desired constant output speed with a continuously variable speed ratio. The continuously variable speed ratio of the IVT can be adjusted by changing the crank length in scotch yoke systems (SYSs). The noncircular gear pair is designed to eliminate speed variations of the output speed of the IVT.

Layout and overview of the IVT: the IVT in FIG. 1 consists of a noncircular gear pair, an input-control module (ICM), and a motion-conversion module (MCM). The IVT includes an input shaft 1, a secondary shaft 2, a control shaft 3, and an output shaft 4. The IVT of FIG. 1 further includes a first planetary gear set (PGS) 5, a second planetary gear set 6, a first scotch yoke system (SYS) 7, and a second scotch yoke system 8. An input rotational speed is first transmitted from the noncircular gear pair to the ICM. Driving and driven noncircular gears are installed on the input shaft and secondary shaft, respectively. With the modulation effect of the noncircular gear pair, a modulated input speed is translated to the secondary shaft in the ICM. The stepper motor mounted on the control shaft in the ICM is used to provide a control speed for adjustment of the input-to-output speed ratio of the IVT.

The control speed and modulated input speed are combined by two 2K-H planetary gear sets (PGSs) on the secondary shaft in the ICM. Combined speeds of ring gears of two PGSs are transmitted to SYSs in the MCM. Two SYSs transmit the combined speeds to translational speeds of yokes; four meshed rack-pinion sets then convert translational speeds of yokes to rotational speeds of four output gears. The output speed of the IVT is the maximum rotational speed of output gears that are rectified by one-way bearings. The detailed design of the IVT is described in "Design, modeling, and experimental validation of a novel infinitely variable transmission based on scotch yoke systems" X. F. Wang, W. D. Zhu, ASME Journal of Mechanical Design 138(1) (2016) 015001, which is incorporated herein by reference in its entirety.

Kinematic model of the IVT: noncircular gears used in the IVT are denoted as a first noncircular gear (NG1) for the driven noncircular gear on the secondary shaft in the motion-conversion module, and a second noncircular gear (NG2) for the driving noncircular gear on the input shaft. The input rotational speed ($w_p$) is transmitted from the prime mover to NG2, as shown in FIG. 1. The rotational speed of NG1 ($w_n$) is transmitted to the corresponding sun gears of two PGSs though the secondary shaft. The control speed ($w_{sg}$) for PGSs are transmitted from the stepper motor to sun gears of PGSs. The rotational speed ($w_n$) of NG1 and control speed ($w_{sg}$) of PGSs are combined with rotational speeds of ring gears. Rotational speeds of ring gears of two PGSs can be represented as $$w_r = \frac{2(d_{sg} + d_{pg})w_n - d_{sg}w_{sg}}{d_{dg} + 2d_{pg}} \qquad (1)$$

where $d_{sg}$ is the pitch diameter of sun gears of PGSs, and $d_{pg}$ is the pitch diameter of planet gears.

Rotational speeds ($w_r$) of ring gears of PGSs are transmitted to two crank gears of the first and second SYSs in the MCM. Rotational speeds of two crank gears can be represented as $w_{cg} = -i_{cg}w_r$, where $i_{cg}$ is the speed ratio of rotational speeds of ring gears and crank gears in SYSs. Here, the speed ratio $i_{cg}$ is designed as 3/4. With the rotational speed of the crank $w_{cr}$, where $w_{cr}=w_{cg}$, a yoke is driven to move with a translational speed in the first SYS. The angle between two cranks in the first and second SYSs is 90°. Displacements of yokes in the first and second SYSs can be represent as $$s_{y1} = \ell_{cr} \cos j_{cr} \tag{2}$$

$$s_{y1} = \ell_{cr}(j_{cr}-90°) \tag{3}$$

respectively, where $\ell_{cr}$ is the crank length, and $j_{cr}$ is the rotational angle of the crank that can be represented as $j_{cr}=\int w_{cr} dt$. Translational speeds of yokes in the first and second SYSs can be represented as $$v_{y1} = \dot{s}_{y1} = \dot{\ell}_{cr} \cos j_{cr} - \ell_{cr} w_{cr} \sin j_{cr} \tag{4}$$

$$v_{y2} = \dot{s}_{y2} = \dot{\ell}_{cr} \cos(j_{cr}-90°) - \ell_{cr} w_{cr} \sin(j_{cr}-90°) \tag{5}$$

respectively.

The yokes are driven by cranks, and their translational speeds are determined by the crank length ($\ell_{cr}$) and rotational angle ($j_{cr}$) of the crank. The crank length ($\ell_{cr}$) changes with rotational angles of two control gears. The crank length ($\ell_{cr}$) can be represented as $$\ell_{cr} = \frac{i_{cg} d_{sg} j_{sg}}{d_{sg} + 2d_{pg}} r_{cg} \tag{6}$$

where $r_{cg}$ is the pitch radius of the crank gear, and $j_{sg}$ is the rotational angle of the corresponding control gear that can be obtained by integrating the control speed $w_{sg}$ with respect to time. The translational speeds of the yokes can be represented as $$v_{y1} = -\ell_{cr} w_{cr} \sin j_{cr} \tag{7}$$

$$v_{y2} = -\ell_{cr} w_{cr} \sin(j_{cr}-90°) \tag{8}$$

respectively.

In some embodiments, four rack-pinion sets are used for translational-rotational motion conversion. Rotational speeds of output gears for two SYSs can be represented as $$\omega_{og} = \begin{bmatrix} w_{og1} \\ w_{og2} \\ w_{og3} \\ w_{og4} \end{bmatrix} = \begin{bmatrix} v_{y1}/r_{og} \\ -v_{y1}/r_{og} \\ v_{y2}/r_{og} \\ -v_{y2}/r_{og} \end{bmatrix} = \frac{\ell_{cr} w_{cr}}{r_{og}} \begin{bmatrix} \sin(j_{cr}-180°) \\ \sin j_{cr} \\ \sin(j_{cr}-270°) \\ \sin(j_{cr}-90°) \end{bmatrix} \tag{9}$$

where $r_{cg}$ is the pitch radius of the output gear, and the "−" sign before $v_{y1}$ and $v_{y2}$ means the counterclockwise direction of the output shaft (as shown in FIG. 1). Since four one-way bearings only allow the maximum rotational speed of four output gears in the clockwise direction to transmit to the output shaft of the IVT, the output speed of the IVT can be represented as $$w_u = \frac{\ell_{cr} w_{cr}}{r_{og}} \max\{\sin j_{cr}, \sin(j_{cr}-90°), \sin(j_{cr}-180°), \sin(j_{cr}-270°)\} \tag{10}$$

where max{·} is a function that selects the maximum value of its arguments. Since sun gears and planet gears of PGSs are designed with $d_{sg}=d_{pg}$, EQN. 1 can also be written as $$w_r = 4/3 w_n - 1/3 w_{sg} \tag{11}$$

With the same initial installation position of SYSs, the relationship between the rotational angle of the crank ($j_{cr}$) and that of NG1 ($j_n$) is $j_{cr}=j_n$. Hence, the input-to-output speed ratio of the IVT can be represented as $$i = \frac{w_p}{w_u} = \frac{\sqrt{2} p r_{og}}{4 \ell_{cr}} \tag{12}$$

Since $r_{og}$ is constant, the input-to-output speed ratio of the IVT can be determined by $\ell_{cr}$.

3. High-Order Pitch Curve Design

The noncircular gear pair (e.g., NG1 and NG2) is designed to transmit power between the input shaft and secondary shaft of the IVT, which has a variable speed ratio. Synthesis of high-order elliptical pitch curves of noncircular gears is designed by formulation of a convexity condition through determination of their speed ratio and rotation transformation of centroids. In this section, determination of conjugated high-order elliptical pitch curves is investigated based on kinematic equations of the IVT detailed herein. This analysis can be used to choose a suitable shaper-cutter for advantageous manufacturing of noncircular gears.

High-order elliptical pitch curves: Noncircular gears are designed herein based on high-order elliptical pitch curves instead of typical elliptically-shaped pitch curves. In other words, the disclosure provides a method for designing noncircular gears with high-order elliptical pitch curves. Since the input-to-output speed ratio of the IVT depends on crank lengths of SYSs, the changing rate of the crank length causes instantaneous speed variations of the output speed of the IVT, which result in variations of the instantaneous speed ratio of the MCM. The speed ratio between the ICM and MCM can be represented as $$i_n(j_n) = \frac{w_p(j_p)}{w_n(j_n)} = \frac{dj_p/dt}{dj_n/dt} \tag{13}$$

where $j_n$ is the rotational angle of NG1 with a period of 2p, $w_n$ is the rotational speed of NG1, and $j_p$ is the rotational angle of NG2. The speed ratio between the output shaft and NG2 can be represented as $$\frac{i(j_n)}{i_n(j_n)} = \frac{w_u(j_n)}{w_n(j_n)} \frac{w_n(j_n)}{w_p(j_p)} = \frac{w_u(j_n)}{w_p(j_p)} \tag{14}$$

By submitting EQN. 10 and $j_{cr}=j_n$ into EQN. 14, the speed ratio of the noncircular gear pair can be represented as $$i_n(j_n) = \frac{\sqrt{2} p}{4} \max\{\sin j_n, \sin(j_n-90°), \sin(j_n-180°), \sin(j_n-270°)\} \tag{15}$$

The speed ratio $i_n$ ($i_n$) that is obtained by EQN. 15 can be applied to design pitch curves of the conjugated noncircular gear pair of the IVT. The center distance of two noncircular gears is $$D = r_{NG1}(j_n) + r_{NG2}(j_p) \tag{16}$$

where $r_{NG1}(j_n)$ and $r_{NG2}(j_p)$ are pitch radii of NG1 and NG2 when their rotational angles are $j_n$ and $j_p$, respectively. According to EQN. 13, the differential relation between rotational angles $j_p$ and $j_n$ is $$dj_p = i_n(j_n) dj_n \qquad (17)$$

The position vector of the high-order elliptical pitch curve of NG1 can be represented as $$r_{NG1}(j_n) = \begin{cases} \dfrac{p_n}{1 - E_n \cos\left[m_n l_{n1}\left(j_n - \dfrac{2p}{m_n}\right)\right]} & \left(0 \le j_n \le \dfrac{2p}{m_n} + \dfrac{2p}{h_n l_{n1}}\right) \\[6pt] \dfrac{p_n}{1 - E_n \cos\left[m_n l_{n2}\left(j_n - \dfrac{2p}{m_n} - \dfrac{2p}{h_n l_{n1}}\right) + \dfrac{2p}{h_n}\right]} & \left(\dfrac{2p}{m_n} + \dfrac{2p}{h_n l_{n1}} < j_n \le \dfrac{2p}{m_n} + \dfrac{2p}{h_n l_{n1}} + \dfrac{2p}{h_n l_{n2}}\right) \\[6pt] \dfrac{p_n}{1 - E_n \cos\left[m_n l_{nj}\left(j_n - \dfrac{2p}{m_n} - \sum_{j=1}^{j-1} \dfrac{2p}{h_n l_{nj}}\right) + \dfrac{2(j-1)p}{h_n}\right]} & \left(\dfrac{2p}{m_n} + \sum_{j=1}^{j-1} \dfrac{2p}{h_n l_{nj}} < j_n \le \dfrac{2p}{m_n} + \sum_{j=1}^{j} \dfrac{2p}{h_n l_{nj}}\right) \end{cases} \qquad (18)$$

where $j=1, 2, \ldots, h_n$, $h_n$ is the number of lobes of the pitch curve of NG1, $m_n$ is the order of the elliptical pitch curve, $E_n$ is the eccentricity of the elliptical pitch curve, and $l_{nj}$ is the modified coefficient of the jth elliptical pitch curve. The pitch of the noncircular gear pair ($p_n$) can be represented as $$p_n = \dfrac{pmz_n}{\int_0^{2p} \dfrac{\sqrt{1 + E_n^2 \sin^2 j_n}}{1 + E_n \cos j_n} dj_n} \qquad (19)$$

where m is the modulus of NG1 and NG2, and $z_n$ is the number of teeth of NG1. For the high-order elliptical pitch curve of NG1, each modified coefficient $l_{nj}$ should satisfy $l_{nj} > 1/h_n$ and $$\sum_{j=1}^{h_n} \dfrac{1}{l_{nj}} = h_n \qquad (20)$$

If $j_n = 0$ or $2p$, one has $|r_{NG1}| = p_n$.

Hence, the pitch curve of NG1 that is obtained by EQN. 18 is continuous at the cusp between two neighboring lobes of the pitch curve. In order to evenly distribute teeth on the high-order elliptical pitch curve of NG1, the perimeter of the high-order elliptical pitch curve satisfies $$L_{NG1} = \int_0^{2p} \sqrt{|r_{NG1}|^2 + \left(\dfrac{dr_{NG1}}{dj_n}\right)^2} dj_n = mpz_n \qquad (21)$$

According to EQNS. 16-18, pitch curves of NG1 and NG2 are conjugated with each other, and the speed ratio between NG1 and NG2 can be also represented as $$i_n(j_n) = \begin{cases} \dfrac{D - p_n - aE_n \cos(l_{n1} j_n)}{p_n} & \left(0 \le j_n \le \dfrac{2p}{h_n l_{n1}}\right) \\[6pt] \dfrac{D - p_n - aE_n \cos\left[l_{n2}\left(j_n - \dfrac{2p}{h_n l_{n1}}\right) + \dfrac{2p}{h_n}\right]}{p_n} & \left(\dfrac{2p}{h_n l_{n1}} < j_n \le \dfrac{2p}{h_n l_{n1}} + \dfrac{2p}{h_n l_{n2}}\right) \\[6pt] \dfrac{D - p_n - aE_n \cos\left[l_{nj}\left(j_n - \sum_{j=1}^{j-1} \dfrac{2p}{h_n l_{nj}}\right) + \dfrac{2(j-1)p}{h_n}\right]}{p_n} & \left(\sum_{j=1}^{j-1} \dfrac{2p}{h_n l_{nj}} < j_n \le \sum_{j=1}^{j} \dfrac{2p}{h_n l_{nj}}\right) \end{cases} \qquad (22)$$

Since the pitch curve of NG2 is a closed curve, the speed ratio $i_n(j_n)$ satisfies $$\int_0^{2p} \dfrac{1}{i_n(j_n)} dj_n = \int_0^{\frac{2p}{h_n l_{n1}}} \dfrac{p_n}{D - p_n - DE_n \cos(l_{n1} j_n)} dj_n + \qquad (23)$$

$$\sum_{j=2}^{h_n} \int_{\sum_{j=1}^{j-1} \frac{2p}{h_n l_{nj}}}^{\sum_{j=1}^{j} \frac{2p}{h_n l_{nj}}} \dfrac{p_n}{D - p_n - DE_n \cos\left[l_{nj}\left(j_n - \sum_{j=1}^{j-1} \dfrac{2p}{h_n l_{nj}}\right) + \dfrac{2(j-1)p}{h_n}\right]} dj_n = 2p$$

According to EQN. 17 and EQN. 23, the rotational angle of NG2 can be written as $$j_n = \begin{cases} \int_0^{j_n} \dfrac{p_n}{D - p_n - DE_n\cos(l_{n1}j_n)} dj_n & \left(0 \le j_n \le \dfrac{2p}{h_n l_{n1}}\right) \\[6pt] \int_0^{\frac{2p}{h_n l_{n1}}} \dfrac{p_n}{D - p_n - DE_n\cos(l_{n1}j_n)} dj_n + \\ \int_{\frac{2p}{h_n l_{n1}} + \frac{2p}{h_n l_{n2}}}^{j_n} \dfrac{p_n}{D - p_n - DE_n\cos} dj_n & \left(\dfrac{2p}{h_n l_{n1}} < j_n \le \dfrac{2p}{h_n l_{n1}} + \dfrac{2p}{h_n l_{n2}}\right) \\ \left[l_{n2}\left(j_n - \dfrac{2p}{h_n l_{n1}}\right) = \dfrac{2p}{h_n}\right] \\[6pt] \int_0^{\frac{2p}{h_n l_{n1}}} \dfrac{p_n}{D - p_n - DE_n\cos(l_{n1}j_n)} dj_n + \\ \sum_{j=2}^{h_n - 1} \int_{\sum_{j=1}^{j-1} \frac{2p}{h_n l_{nj}}}^{\sum_{j=1}^{j} \frac{2p}{h_n l_{nj}}} \dfrac{p_n}{D - p_n - DE_n\cos} dj_n + & \left(\sum_{j=1}^{j-1} \dfrac{2p}{h_n l_{nj}} < j_n \le \sum_{j=1}^{j} \dfrac{2p}{h_n l_{nj}}\right) \\ \left[l_{n2}\left(j_n - \dfrac{2p}{h_n l_{n1}}\right) + \dfrac{2p}{h_n}\right] \\[6pt] \sum_{j=2}^{h_n - 1} \int_{\sum_{j=1}^{j-1} \frac{2p}{h_n l_{nj}}}^{j_n} \dfrac{p_n}{D - p_n - DE_n\cos} dj_n \\ \left[l_n\left(j_n - \sum_{j=1}^{j-1} \dfrac{2p}{h_n l_{nj}}\right) + \dfrac{2(j-1)p}{h_n}\right] \end{cases} \quad (24)$$

The center distance (D) of two noncircular gears is equal to the constant center distance between the input shaft and secondary shaft of the IVT. According to EQN. 16, EQN. 18, and EQN. 24, the position vector of the high-order elliptical pitch curve of NG2 can be represented as $$r_{NG2}(j_n) = \begin{cases} D - \dfrac{p_n}{1 - E_n\cos(l_{n1}j_n)} & \left(0 \le j_n \le \dfrac{2p}{h_n l_{n1}}\right) \\[6pt] D - \dfrac{p_n}{1 - E_n\cos} & \left(\dfrac{2p}{h_n l_{n1}} < j_n \le \dfrac{2p}{h_n l_{n1}} + \dfrac{2p}{h_n l_{n2}}\right) \\ \left[m_n l_{n2}\left(j_n - \dfrac{2p}{m_n} - \dfrac{2p}{h_n l_{n1}}\right) + \dfrac{2p}{h_n}\right] \\[6pt] D - \dfrac{p_n}{1 - E_n\cos} & \left(\sum_{j=1}^{j-1} \dfrac{2p}{h_n l_{nj}} < j_n \le \sum_{j=1}^{j} \dfrac{2p}{h_n l_{nj}}\right) \\ \left[m_n l_{nj}\left(j_n - \dfrac{2p}{m_n} - \sum_{j=1}^{j-1} \dfrac{2p}{h_n l_{nj}}\right) + \dfrac{2(j-1)p}{h_n}\right] \end{cases} \quad (25)$$

Figure 2A:
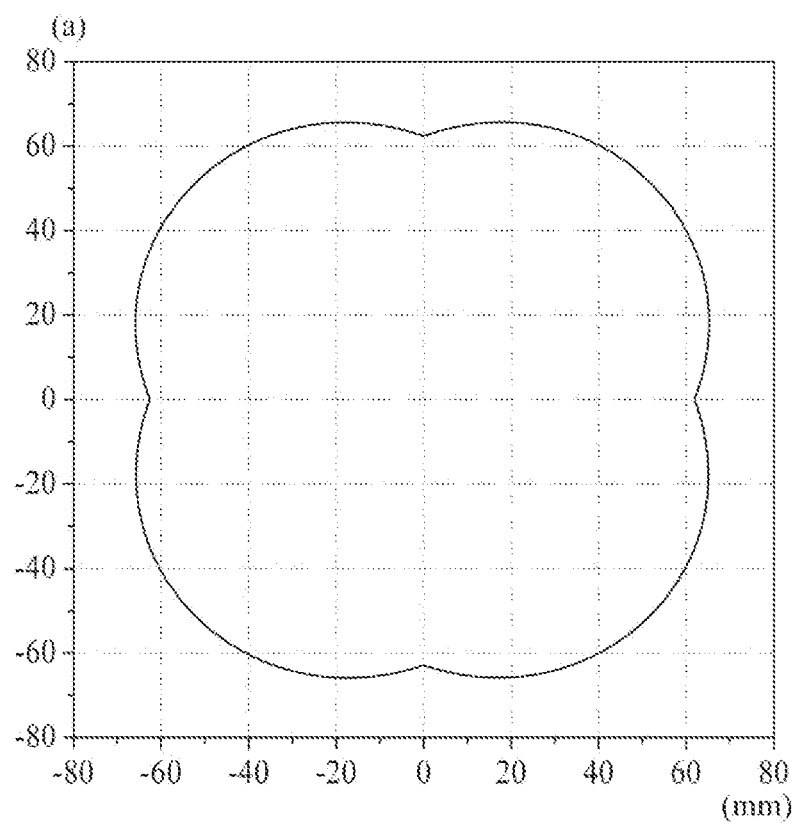
FIG. 2A is a high-order elliptical pitch curve for a noncircular gear.
Figure 2B:
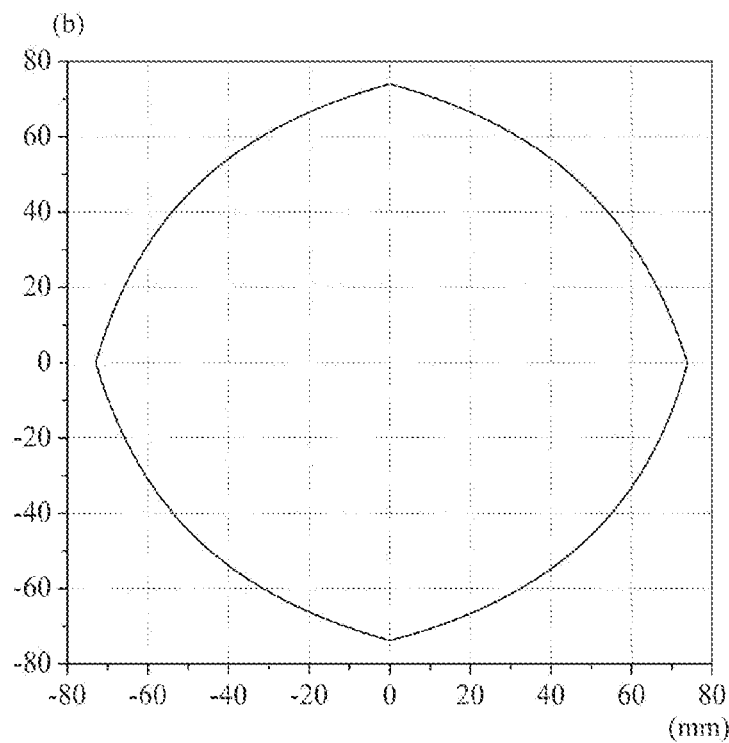
FIG. 2B is a high-order elliptical pitch curve for a noncircular gear.

Table 1 lists parameters of the noncircular gear pair of the IVT. High-order elliptical pitch curves of NG1 and NG2 are generated based on EQN. 18 and EQN. 25 and illustrated in FIG. 2A and FIG. 2B, respectively. The noncircular gear pair can provide the desired speed ratio to eliminate speed variations of the IVT. However, there are cusps between every two neighboring lobes of high-order elliptical pitch curves of NG1 and NG2. These cusps have negative effects on meshing smoothness and manufacturability of the noncircular gear pair. For noncircular gear manufacturing, all lobes of high-order elliptical pitch curves of noncircular gears should be convex. Convexity analysis of high-order elliptical pitch curves of NG1 and NG2 is used for determining the eccentricity $E_n$ of the noncircular gear pair.

TABLE 1

Parameters of elliptical portions of the noncircular gear pair

| Item | NG1 | NG2 |
|---|---|---|
| Number of teeth | 42 | 42 |
| Module (mm) | 3 | |
| Center distance (mm) | 135 | |
| Face width (mm) | 20 | |
| Number of lobes of the pitch curve | 4 | |
| Order of the pitch curve | 4 | |
| Eccentricity of the elliptical pitch curve | 0.15 | |
| Modified coefficient of the pitch curve | 0.55 | |

Convexity Analysis of High-Order Elliptical Pitch Curves: The first and second derivatives of the position vector of the high-order elliptical pitch curve of NG1 with respect to the rotational angle $j_n$ can be represented as $$\dot{r}_{NG1} = \frac{dr_{NG1}}{dj_n} = \frac{m_n l_{nj} p_n E_n \sin\left[m_n l_{nj}\left(j_n - \frac{2p}{m_n}\right)\right]}{\left\{1 - E_n \cos\left[m_n l_{nj}\left(j_n - \frac{2p}{m_n}\right)\right]\right\}^2} \quad (26)$$

$$\ddot{r}_{NG1} = \frac{d^2 r_{NG1}}{dj_n^2} = \frac{m_n^2 l_{nj}^2 p_n E_n^2 \left\{\frac{1}{E_n}\cos\left[m_n l_{nj}\left(j_n - \frac{2p}{m_n}\right)\right] - \sin^2\left[m_n l_{nj}\left(j_n - \frac{2p}{m_n}\right)\right] - 1\right\}}{\left\{1 - E_n \cos\left[m_n l_{nj}\left(j_n - \frac{2p}{m_n}\right)\right]\right\}^3} \quad (27)$$

respectively. The curvature of each lobe of the pitch curve of NG1 is $$r_n = p_n \frac{\{[1 - E_n\cos(l_{nj}j_n)]^2 + E_n^2 l_{nj}^2 \sin^2(l_{nj}j_n)\}^{\frac{3}{2}}}{[1 - E_n\cos(l_{nj}j_n)]^3 [1 + E_n(l_{nj}^2 - 1)\cos(l_{nj}j_n)]} \quad (28)$$

In order to make each segment of the pitch curve convex, the curvature of each lobe of the pitch curve of NG1 must be positive. Since the numerator in EQN. 28 is always greater than zero, the denominator in EQN. 28 should also be greater than zero to ensure the curvature $r_n$ of each lobe of the pitch curve of NG1 is positive. Hence, the condition that each lobe of the pitch curve is convex, one has $$1 + E_n(m_n^2 l_{n1}^2 - 1)\cos(m_n l_n j_n) \geq 0 \quad (29)$$

According to EQN. 29, the eccentricity $E_n$ of the noncircular gear pair satisfies $$E_n \leq \frac{1}{\left(1 - m_n^2 l_{n1}^2\right)\cos(m_n l_{n1} j_n)} \quad (30)$$

Modification of High-Order Elliptical Pitch Curves: Since there are cusps between every two neighboring lobes of high-order elliptical pitch curves of NG1 and NG2, the positive convexity of each lobe of the pitch curves cannot guarantee the positive convexity of the whole high-order elliptical pitch curves. Regardless of a hobbing cutter or a shaping cutter, a generation process of a noncircular gear can be described as non-sliding motion between the high-order elliptical pitch curve of NG1 and a pitch circle of the hobbing or shaping cutter. There are two tangent points on both sides of a cusp between the high-order elliptical pitch curve of NG1 and pitch circle of the hobbing or shaping cutter. Hence, tooth surfaces of noncircular gears at cusps cannot be manufactured by the hobbing cutter or shaping cutter. A high-order pitch curve modification method of noncircular gears is disclosed herein to improve manufacturability of high-order elliptical pitch curves of NG1 and NG2.

The slope of an arbitrary point on the high-order elliptical pitch curve of NG1 can be represented as $$k_n = \frac{\dot{r}_{NG1}\sin j_n + r_{NG1}\cos j_n}{\dot{r}_{NG1}\cos j_n - r_{NG1}\sin j_n} \quad (31)$$

Figure 3A:
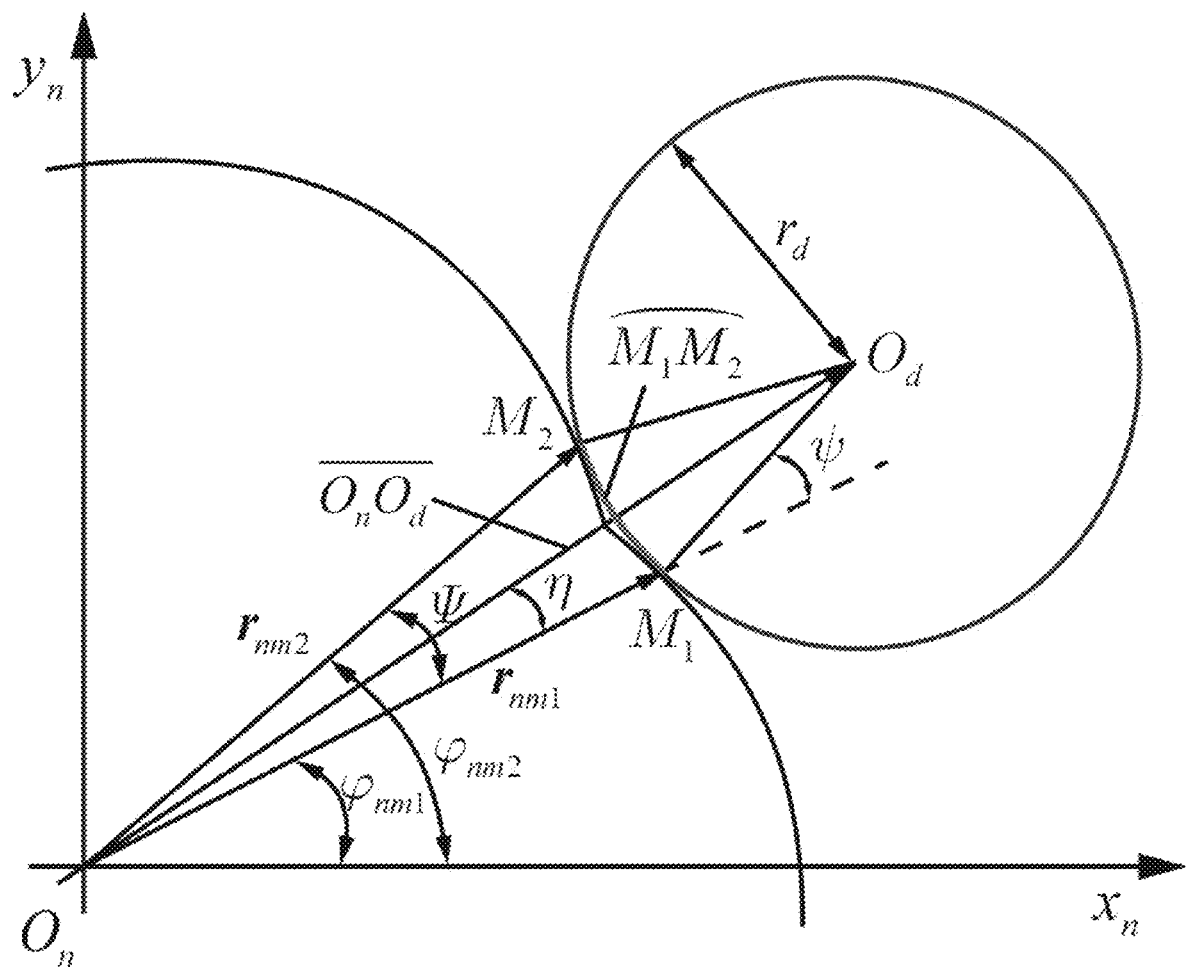
FIG. 3A is a schematic illustrating modification of the high-order elliptical pitch curve of FIG. 2A.
Figure 3B:
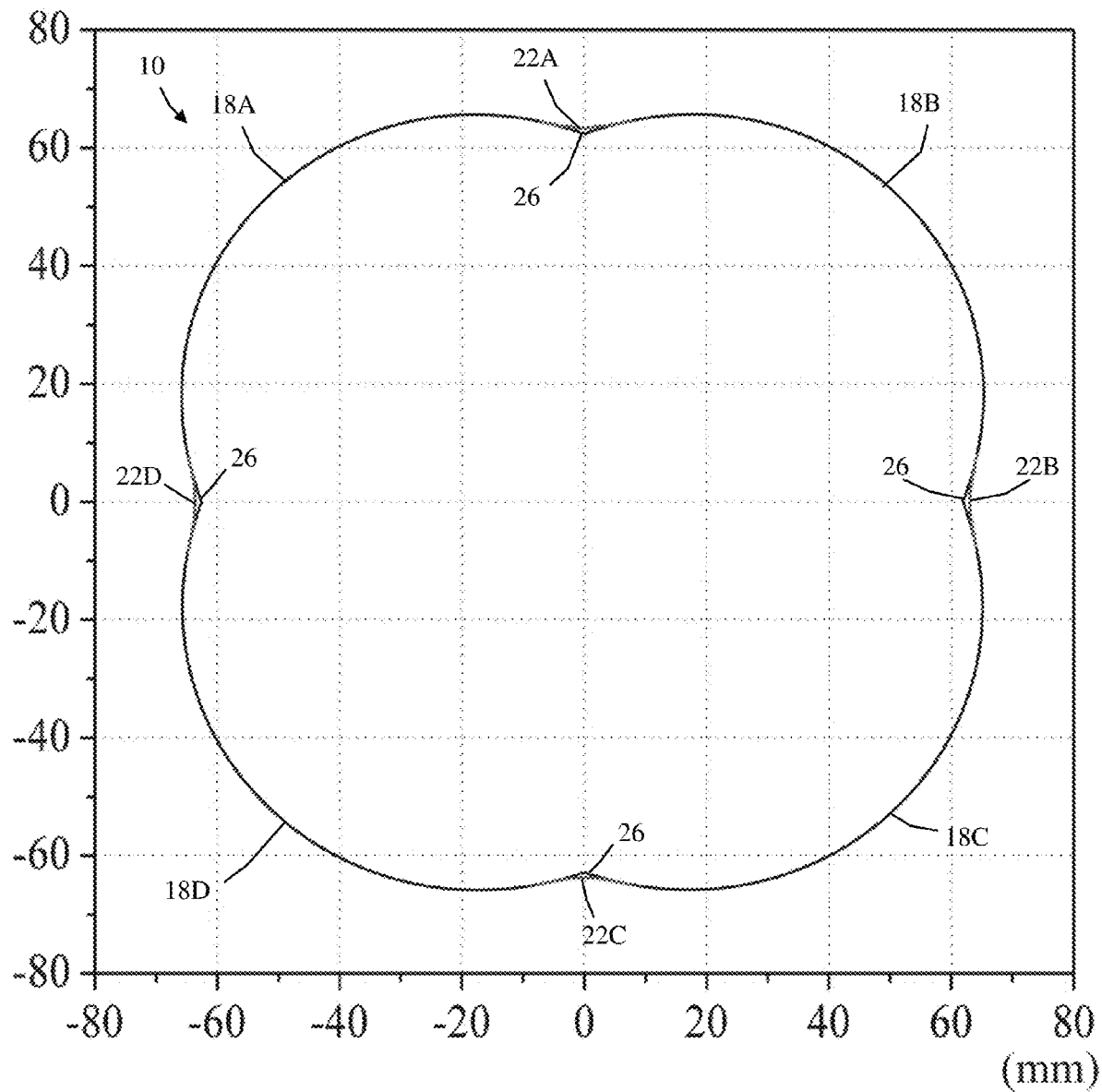
FIG. 3B is a modified high-order elliptical pitch curve for a noncircular gear.
Figure 3C:
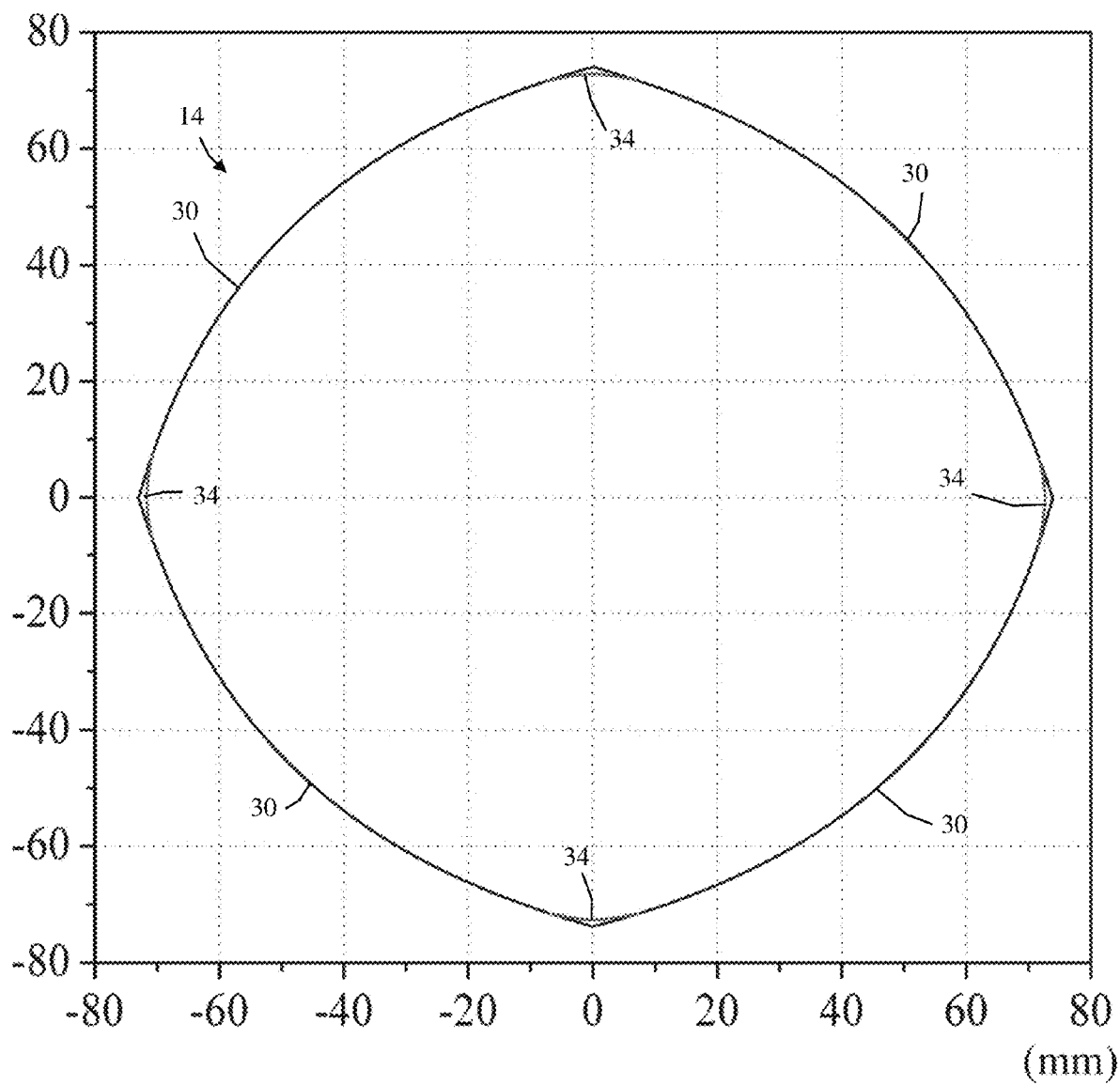
FIG. 3C is a modified high-order elliptical pitch curve for a noncircular gear.

With reference to FIG. 3, the high-order elliptical pitch curve of NG1 and pitch circle of the shaping cutter are tangent at points $M_1$ and $M_2$. A coordinate system $S_n(x_n,y_n)$ is attached to NG1, where $O_n$ is the center of the pitch curve of NG1. The point $O_d$ is the center of the shaping cutter.

Position vectors of $M_1$ and $M_2$ are denoted as $r_{nm1}(j_{nm1})$ and $r_{nm2}(j_{nm2})$, respectively, and $j_{nm1}$ and $j_{nm2}$ are polar angles of $M_1$ and $M_2$, respectively. In $\Delta OM_1M_2$, the distance between $M_1$ and $M_2$ can be represented as $$|\overline{M_1 M_2}| = \sqrt{|r_{nm1}|^2 + |r_{nm2}|^2 - 2|r_{nm1}||r_{nm2}|\cos Y} \quad (32)$$

where $Y = j_{nm2} - j_{nm1}$. The angle between $r_{nm1}(j_{nm1})$ and $\overline{O_n O_d}$ can be represented as $$h = \arccos\left(\frac{|\overline{M_1 M_2}|}{2r_d}\right) + \arcsin\left(\frac{|r_{nm1}|\sin Y}{|\overline{M_1 M_2}|}\right) \quad (33)$$

where $r_d$ is the pitch radius of the shaping cutter, which is 30 mm in this study. The distance between $O_n$ and $O_d$ is $$|\overline{O_n O_d}| = \sqrt{|r_{nm1}|^2 + r_d^2 - 2|r_{nm1}|r_d \cos h} \quad (34)$$

The angle between $r_{nm1}(j_{nm1})$ and $\overline{M_1 O_d}$ can be represented as $$y = \arcsin\left(\frac{r_d}{|\overline{O_n O_d}|}\sinh\right).$$

Consider an arbitrary point $G_1$ on the modified pitch curve $M_1 M_2$; the position vector of $G_1$ is denoted as $r_{ng1}(j_{ng1})$, where $j_{ng1}$ is the angle between $r_{nm1}(j_{nm1})$ and $\overline{O_n G_1}$. The distance between $O_n$ and $G_1$ can be represented as $$|r_{ng1}(j_{ng1})| = |\overline{O_n O_d}|\cos(j_{ng1} - y) - \sqrt{r_d^2 - |\overline{O_n O_d}|^2 \sin^2(j_{ng1} - y)} \quad (35)$$

The first and second derivatives of the position vector $r_{ng1}$ of the point $G_1$ with respect to the angle $j_{ng1}$ can be represented as $$\frac{dr_{ng1}}{dj_{ng1}} = \overline{O_n O_d}\left\{\frac{\overline{O_n O_d}\cos(j_{ng1} - y)}{[r_d^2 - |\overline{O_n O_d}|^2\sin^2(j_{ng1} - y)]^{1/2}} - 1\right\}\sin(j_{ng1} - y) \quad (36)$$

$$\frac{d^2 r_{ng1}}{dj_{ng1}^2} = \overline{O_n O_d}\left\{\frac{(|\overline{O_n O_d}|^2 - r_d^2)|\overline{O_n O_d}|^2\sin^2(j_{ng1} - y)}{[r_d^2 - |\overline{O_n O_d}|^2\sin^2(j_{ng1} - y)]^{3/2}} + \frac{\overline{O_n O_d}\cos^2(j_{ng1} - y)}{[r_d^2 - |\overline{O_n O_d}|^2\sin^2(j_{ng1} - y)]^{1/2}} - \cos(j_{ng1} - y)\right\} \quad (37)$$

respectively. Assume that the point $G_2$ is the meshing point of $G_1$ on the modified pitch curve of NG2. The polar angle of $G_2$ is denoted as $j_{2g}$. The position vector of $G_2$ on the modified pitch curve of NG2 can be represented as $$r_{pg2} = \int_0^{2p} \frac{(r_{ng1} - D)}{r_{ng1}} \frac{dr_{ng1}}{dj_{ng1}} dj_{pg2} \quad (38)$$

As disclosed herein, some embodiments include a noncircular gear pair including a first noncircular gear with a first pitch curve 10 (FIG. 3B) and a second noncircular gear with a second pitch curve 14. The first pitch curve 10 includes a plurality of elliptical portions 18A, 18B, 18C, and 18D. In some embodiments, the plurality of elliptical portions includes any number of suitable elliptical portions including, but not limited to, 3, 4, 5, 6, 7, 8, 9, 10, or more. In the illustrated embodiment, the plurality of elliptical portions includes four elliptical portions 18A, 18B, 18C, and 18D. In some embodiments, the plurality of elliptical portions includes six elliptical portions. In some embodiments, each of the plurality of elliptical portions has an eccentricity within a range of approximately 0.1 to approximately 0.9. In some embodiments, each of the plurality of elliptical portions has an eccentricity within a range of approximately 0.1 to approximately 0.3. In some embodiments, each of the plurality of elliptical portions has an eccentricity within a range of approximately 0.2 to approximately 0.4. In the illustrated embodiment, each of the plurality of elliptical portions 18A-18D has an eccentricity of approximately 0.15. In some embodiments, a modified coefficient of the pitch curve is in a range of approximately 0.25 to approximately 1. In some embodiments, the modified coefficient of the pitch curve is approximately 0.55.

In some embodiments, the first pitch curve 10 includes a plurality of modified transition portions 22A, 22B, 22C, 22D. In the illustrated embodiment, each of the plurality of modified transition portions 22A-22D is positioned between adjacent elliptical portions 18A-18D. For example, modified transition portion 22A is positioned between the elliptical portion 18A and the elliptical portion 18B. As detailed herein, a curvature of the first pitch curve 10 is positive along the entire first pitch curve. The first pitch curve 10 includes no cusps (e.g., the cusps 26 from the unmodified high-order pitch curve are removed). Advantageously, unlike the noncircular gear with cusps, the first pitch curve 10 of the first noncircular gear is manufacturable by a shaping cutter. For example, in some embodiments, the first pitch curve 10 is manufacturable with a shaping cutter with a constant pitch radius of approximately 30 mm.

In some embodiments, the second pitch curve 14 of the second noncircular gear is a conjugate of the first pitch curve. In the illustrated embodiment, the second pitch curve 14 includes elliptical portions 30 and modified transition portions 34 between adjacent elliptical portions 30.

4. Tooth Profiles of Noncircular Gears

For involute tooth profiles of noncircular gears, each point on a tooth profile is determined by its center of curvature. The involute tooth profile can be generated by its sequence of centers of curvature that is its evolute. Since two tooth profiles of a tooth of a noncircular gear have different evolutes, tooth profiles of the noncircular gear are represented by different involutes.

Figure 4:
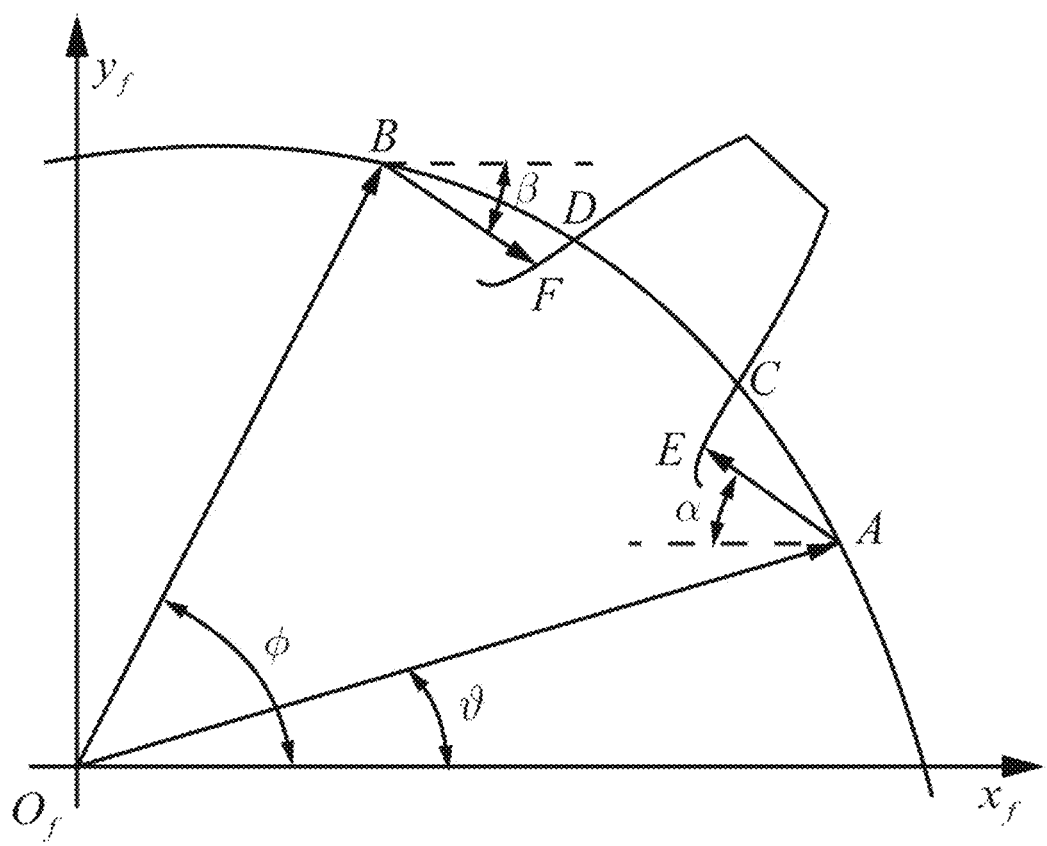
FIG. 4 is a schematic of coordinates of two tooth profiles of a tooth of a noncircular gear.

With reference to FIG. 4, a coordinate system $S_f(x_f, y_f)$ is attached to NG1, where $O_f$ is a focal point of the elliptical pitch curve of NG1, and J and f are polar angles of arbitrary points A and B on the pitch curve of NG1, respectively. Points E and F are the corresponding points on right and left tooth profiles of a tooth of NG1 that are generated by points A and B, respectively. Points C and D are pitch points of right and left tooth profiles of the tooth of NG1, respectively. The position vector of the point E can be represented as $$r_{fR} = \overline{O_f A} + \overline{AE} \quad (39)$$

Coordinates of the point E can be written as $$\begin{cases} x_{fR} = \overline{O_f A} \cdot \cos J - \overline{AE} \cdot \cos a \\ y_{fR} = \overline{O_f A} \cdot \sin J + \overline{AE} \cdot \sin a \end{cases} \quad (40)$$

where a is the angle between $\overline{AE}$ and the $x_f$-axis. The position vector of the point F can be represented as $$r_{fL} = \overline{O_f B} + \overline{BF} \quad (41)$$

Figure 5:
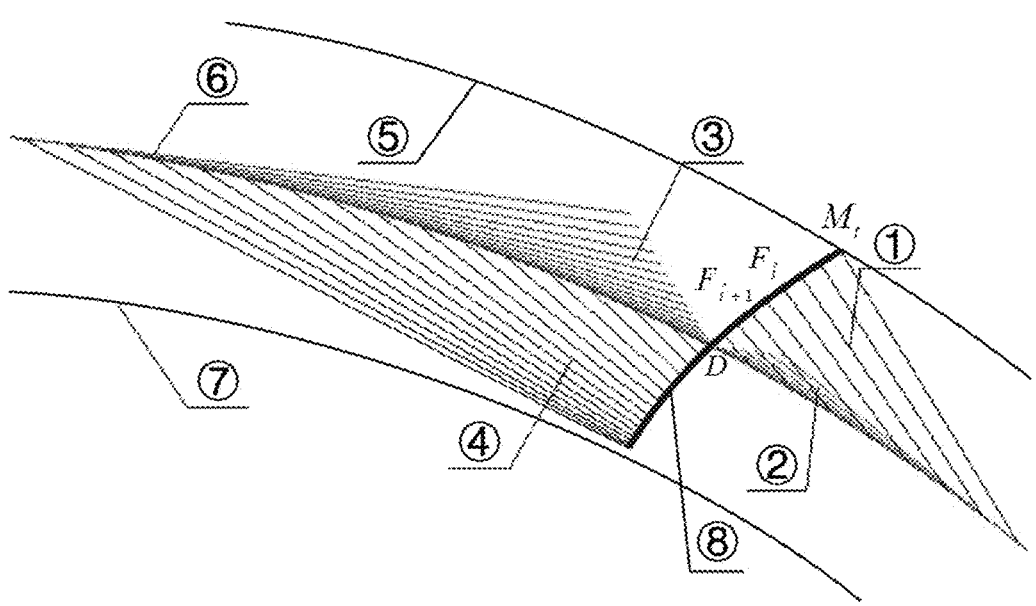
FIG. 5 is a left tooth profile of a tooth of a noncircular gear.

Coordinates of the point F are $$\begin{cases} x_{fL} = \overline{O_f B} \cdot \cos f - \overline{BF} \cdot \cos b \\ y_{fL} = \overline{O_f B} \cdot \sin f + \overline{BF} \cdot \sin b \end{cases} \quad (42)$$

where b is the angle between $\overline{BF}$ and the $x_f$-axis. Surface coordinates of the point F are denoted as $(u_F, j_F)$. The point $M_t(u_t, j_t)$ is the intersection of the left tooth profile and tip line of the tooth of NG1, as shown in FIG. 5. If points F and $M_t$ coincide, the curve length between $M_t$ and the tip line of the tooth surface of NG1 is $$F(u_t, j_t) = F(u_F, j_F) = 0 \quad (43)$$

The polar angle difference between F and $M_t$ of the tooth surface of NG1 is $$R(u_t, j_t) = f_t(u_t, j_t) - f_F(u_F, j_F) = 0 \quad (44)$$

With EQNS. 42-44, surface coordinates of $M_t(u_t, j_t)$ can be solved using Newton-Raphson method. Consider a point $F_{\hat{i}}(u_{F\hat{i}}, j_{F\hat{i}})$ is the $\hat{i}$th point that is generated by the movable point B on the pitch curve of NG1. Let the curve length between $F_{\hat{i}}$ and $M_t$ be $F(u_{F\hat{i}}, j_{F\hat{i}})$, and the polar angle difference between $F_{\hat{i}}$ and $M_t$ be $R(u_{F\hat{i}}, j_{F\hat{i}})$. Surface coordinates of $F_{\hat{i}+1}$ can be obtained by selecting $\Delta u$ and $\Delta j$ as increments of $u_{F\hat{i}}$ and $j_{F\hat{i}}$, respectively. Hence, $F(u_{F\hat{i}}+\Delta u, j_{F\hat{i}}+\Delta j)$ and $R(u_{F\hat{i}}+\Delta u, j_{F\hat{i}}+\Delta j)$ at $F_{\hat{i}+1}$ can be written as $$F(u_{F\hat{i}}+\Delta u, j_{F\hat{i}}+\Delta j) = F(u_{F\hat{i}}, j_{F\hat{i}}) + \Delta u\left(\frac{\partial F}{\partial u_{F\hat{i}}}\right) + \Delta j\left(\frac{\partial F}{\partial j_{F\hat{i}}}\right) + \ldots = 0 \quad (45)$$

$$R(u_{F\hat{i}}+\Delta u, j_{F\hat{i}}+\Delta j) = R(u_{F\hat{i}}, j_{F\hat{i}}) + \Delta u\left(\frac{\partial R}{\partial u_{F\hat{i}}}\right) + \Delta j\left(\frac{\partial R}{\partial j_{F\hat{i}}}\right) + \ldots = 0 \quad (46)$$

EQN. 45 and EQN. 46 can be written as $$\left(\frac{\partial F}{\partial u_{F\hat{i}}}\right)\Delta u + \left(\frac{\partial F}{\partial j_{F\hat{i}}}\right)\Delta j = -F(u_{F\hat{i}}, j_{F\hat{i}}) \quad (47)$$

$$\left(\frac{\partial R}{\partial u_{F\hat{i}}}\right)\Delta u + \left(\frac{\partial R}{\partial j_{F\hat{i}}}\right)\Delta j = -R(u_{F\hat{i}}, j_{F\hat{i}}) \quad (48)$$

respectively, where $\Delta u$ and $\Delta j$ can be solved as $$\Delta u = \frac{-F(u_{F\hat{i}}, j_{F\hat{i}})\left(\frac{\partial R}{\partial j_{F\hat{i}}}\right) + R(u_{F\hat{i}}, j_{F\hat{i}})\left(\frac{\partial F}{\partial j_{F\hat{i}}}\right)}{\left(\frac{\partial F}{\partial u_{F\hat{i}}}\right)\left(\frac{\partial R}{\partial j_{F\hat{i}}}\right) - \left(\frac{\partial F}{\partial j_{F\hat{i}}}\right)\left(\frac{\partial R}{\partial u_{F\hat{i}}}\right)} \quad (49)$$

$$\Delta j = -\frac{-F(u_{F\hat{i}}, j_{F\hat{i}})\left(\frac{\partial R}{\partial u_{F\hat{i}}}\right) + R(u_{F\hat{i}}, j_{F\hat{i}})\left(\frac{\partial F}{\partial u_{F\hat{i}}}\right)}{\left(\frac{\partial F}{\partial u_{F\hat{i}}}\right)\left(\frac{\partial R}{\partial j_{F\hat{i}}}\right) - \left(\frac{\partial F}{\partial j_{F\hat{i}}}\right)\left(\frac{\partial R}{\partial u_{F\hat{i}}}\right)} \quad (50)$$

respectively, in which $$\frac{\partial F}{\partial u_{Fi}}, \frac{\partial R}{\partial u_{Fi}}, \frac{\partial F}{\partial j_{Fi}}, \text{ and } \frac{\partial R}{\partial j_{Fi}}$$

can be represented as $$\frac{\partial F}{\partial u_{Fi}} = \frac{F(u_{Fi} + \Delta u, j_{Fi}) - F(u_{Fi}, j_{Fi})}{\Delta u} \quad (51)$$

$$\frac{\partial R}{\partial u_{Fi}} = \frac{R(u_{Fi} + \Delta u, j_{Fi}) - R(u_{Fi}, j_{Fi})}{\Delta u} \quad (52)$$

$$\frac{\partial F}{\partial j_{Fi}} = \frac{F(u_{Fi}, j_{Fi} + \Delta j) - F(u_{Fi}, j_{Fi})}{\Delta j} \quad (53)$$

$$\frac{\partial R}{\partial j_{Fi}} = \frac{R(u_{Fi}, j_{Fi} + \Delta j) - R(u_{Fi}, j_{Fi})}{\Delta j} \quad (54)$$

respectively.

With reference to FIG. 5, a left tooth profile of a tooth of NG1 is illustrated, where (1) and (4) are clusters of $\overline{BF}$, (2) and (3) are clusters of tangent lines of the pitch curve through the movable point B, (5) is the tip line, (6) is the pitch curve, (7) is the root line, and (8) is the left tooth profile.

Surface coordinates of any point of tooth surfaces of NG1 and NG2 can also be solved using the method mentioned above. The curve length between two neighboring points of tooth surfaces of NG1 and NG2 is equal to $p_n/24$ here. Coordinates of the gear tooth surface of NG1 can be calculated by EQNS. (45) and (46), as shown in Table 2. In some embodiments, the first noncircular gear includes a first plurality of teeth and the second noncircular gear pair includes a second plurality of teeth. In some embodiments, the number of teeth on the first noncircular gear is equal to the number of teeth on the second noncircular gear. In some embodiments, the number of teeth on the first noncircular gear is not equal to the number of teeth on the second noncircular gear.

TABLE 2

Curve lengths of $\overset{\frown}{A}C$ and $\overset{\frown}{B}D$ and lengths of $\overline{AE}$ and $\overline{BF}$ for different polar angles J and f

| | Right tooth surface | | Left tooth surface | | |
|---|---|---|---|---|---|
| J/° | $\overset{\frown}{A}$C/mm | $\overline{AE}$/mm | f/° | $\overset{\frown}{B}$D/mm | $\overline{BF}$/mm |
| 23.377 | 6.077 | 5.711 | 60.443 | 6.078 | 5.711 |
| 24.277 | 5.318 | 4.997 | 59.172 | 5.318 | 4.997 |
| 25.180 | 4.559 | 4.284 | 57.923 | 4.558 | 4.283 |
| 26.086 | 3.799 | 3.570 | 56.694 | 3.798 | 3.569 |
| 26.995 | 3.039 | 2.856 | 55.488 | 3.038 | 2.856 |
| 27.908 | 2.279 | 2.142 | 54.299 | 2.279 | 2.142 |
| 28.824 | 1.519 | 1.427 | 53.130 | 1.519 | 14.27 |
| 29.744 | 0.760 | 0.714 | 51.978 | 0.760 | 0.714 |
| 31.599 | 0.760 | 0.714 | 49.725 | 0.759 | 0.713 |
| 32.534 | 1.519 | 1.427 | 48.620 | 1.519 | 1.427 |
| 33.475 | 2.279 | 2.142 | 47.531 | 2.279 | 2.142 |
| 34.422 | 3.039 | 2.856 | 46.455 | 3.039 | 2.856 |
| 35.376 | 3.798 | 3.569 | 45.393 | 3.799 | 3.570 |
| 36.337 | 4.558 | 4.283 | 44.344 | 4.559 | 4.284 |
| 37.305 | 5.317 | 4.996 | 43.308 | 5.318 | 4.997 |
| 38.282 | 6.076 | 5.710 | 42.282 | 6.078 | 5.711 |
| 39.268 | 6.836 | 6.424 | 41.267 | 6.837 | 6.425 |
| 40.262 | 7.595 | 7.137 | 40.262 | 7.579 | 7.122 |

TABLE 2-continued

Curve lengths of $\overset{\frown}{A}C$ and $\overset{\frown}{B}D$ and lengths of $\overline{AE}$ and $\overline{BF}$ for different polar angles J and f

| | Right tooth surface | | Left tooth surface | | |
|---|---|---|---|---|---|
| J/° | $\overset{\frown}{A}$C/mm | $\overline{AE}$/mm | f/° | $\overset{\frown}{B}$D/mm | $\overline{BF}$/mm |
| 41.267 | 8.355 | 7.851 | 39.268 | 8.356 | 7.852 |
| 42.282 | 9.115 | 8.565 | 38.282 | 9.116 | 8.566 |
| 43.308 | 9.875 | 9.279 | 37.305 | 9.876 | 9.280 |
| 44.344 | 10.634 | 9.993 | 36.337 | 10.635 | 9.994 |
| 45.393 | 11.393 | 10.706 | 35.376 | 11.394 | 10.707 |
| 46.455 | 12.153 | 11.420 | 34.422 | 12.154 | 11.421 |

5. Power Loss Evaluation of Noncircular Gears

Sliding friction power loss accounts for most of power losses of a gear system under low-speed and high-torque conditions. Time-varying friction forces and sliding velocities of meshing tooth surfaces of noncircular gears are main excitation sources of sliding friction power loss.

Friction Forces: Friction forces of gear tooth surfaces are determined by normal load distribution and the coefficient of friction (COF) of meshing tooth surfaces. In order to obtain normal load distribution of noncircular gears, a normal load distribution model is described as $$f(i_k, j) = \frac{e_b}{B} \frac{V_p(i_k, j)}{\int_t V_p(i_k, j) d\ell} F_N(i_k, j) \quad (55)$$

where $(i_k, j)$ denotes the ith segment of the kth tooth of NG1 at the jth meshing instant, $F_N$ is the normal load, $e_b$ is the face contact ratio, B is the face width, $V_p$ is the inverse of the elastic potential energy, and $\ell$ is the length of each segment of NG1. The friction force of the ith segment of the kth tooth of NG1 at the jth meshing instant can be represented as $$F_m(i_k, j) = z(i_k, j) f(i_k, j) \quad (56)$$

where $z(i_k, j)$ is the variable COF of a tooth surface that can be obtained by $$z(i_k, j) = \frac{0.0127 \times 1.13}{1.13 - S_{avg}} \log_{10}\left[\frac{29700 f(i_k, j)}{s v_s(i_k, j) v_e^2(i_k, j)}\right] \quad (57)$$

where $S_{avg}$ is the average surface roughness, $v_s$ and $v_e$ are the sliding velocity and entraining velocity, respectively, and s is the viscosity of lubrication oil entering the gear contact. The sliding velocity of the contact point changes with deviation of the curvature of the tooth surface due to modification of the pitch curve and roughness of meshing tooth surfaces. The sliding velocity $v_s(i_k, j)$ and entraining velocity $v_e(i_k, j)$ can be represented as $$V_s(i_k,j) = |v_{NG1}{}^r + V_{NG1}{}^w - V_{NG2}{}^r - V_{NG2}{}^w| \quad (58)$$

$$V_e(i_k,j) = |v_{NG1}{}^r + V_{NG1}{}^w + V_{NG2}{}^r + V_{NG2}{}^w| \quad (59)$$

respectively, where $v_{NG1}{}^r$ and $v_{NG2}{}^r$ are moving velocities of a contact point of NG1 and NG2, respectively, and $v_{NG1}{}^w = w_p \times r_{NG1}$ and $V_{NG2}{}^w = w_n \times r_{NG2}$ are rotation velocities of the contact point around axes of NG1 and NG2, respectively. Numerical analysis settings of friction forces and power losses of the noncircular gear pair are listed in Table 3.

TABLE 3

Numerical analysis settings of friction forces and sliding friction power losses

| Item | Value |
|---|---|
| Input power (W) | 750 |
| Input load (Nm) | 160 |
| Rotational speed of NG1 (rpm) | 45 |
| Viscosity of lubrication oil (mm²/s) | 9.3 |
| Average surface roughness | Ra3.6 |

Figure 6A:
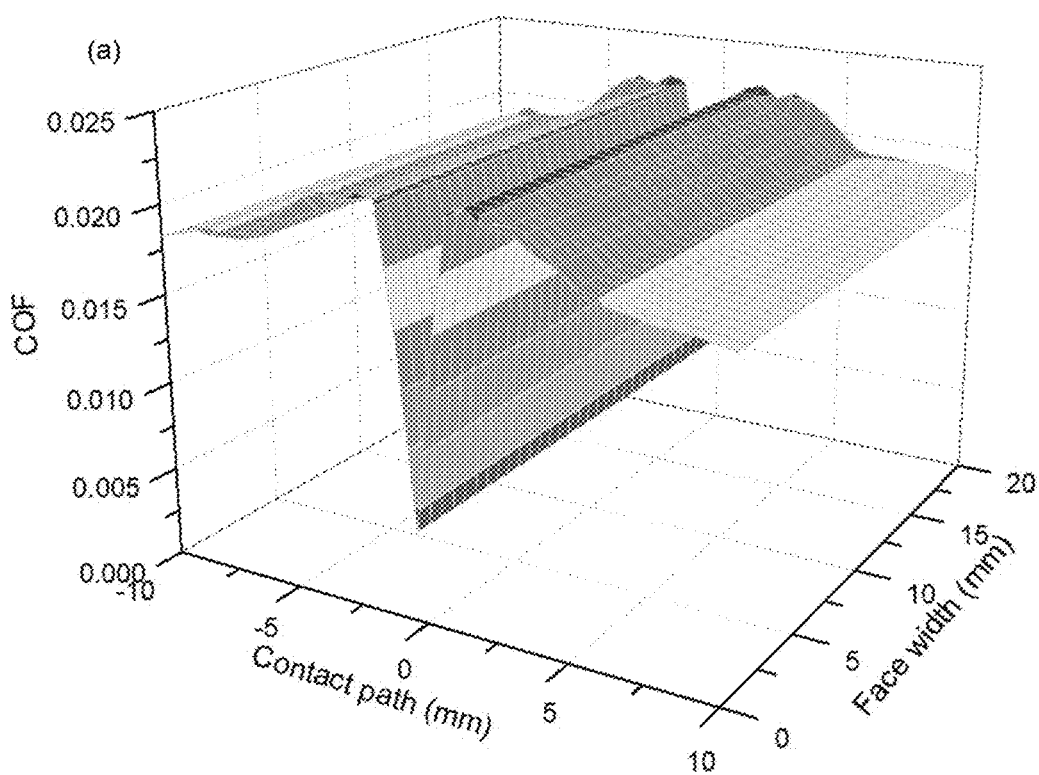
FIG. 6A is a graph of numerical results of coefficient of friction (COF) of tooth surfaces of the noncircular gear pair with the unmodified pitch curve.
Figure 6B:
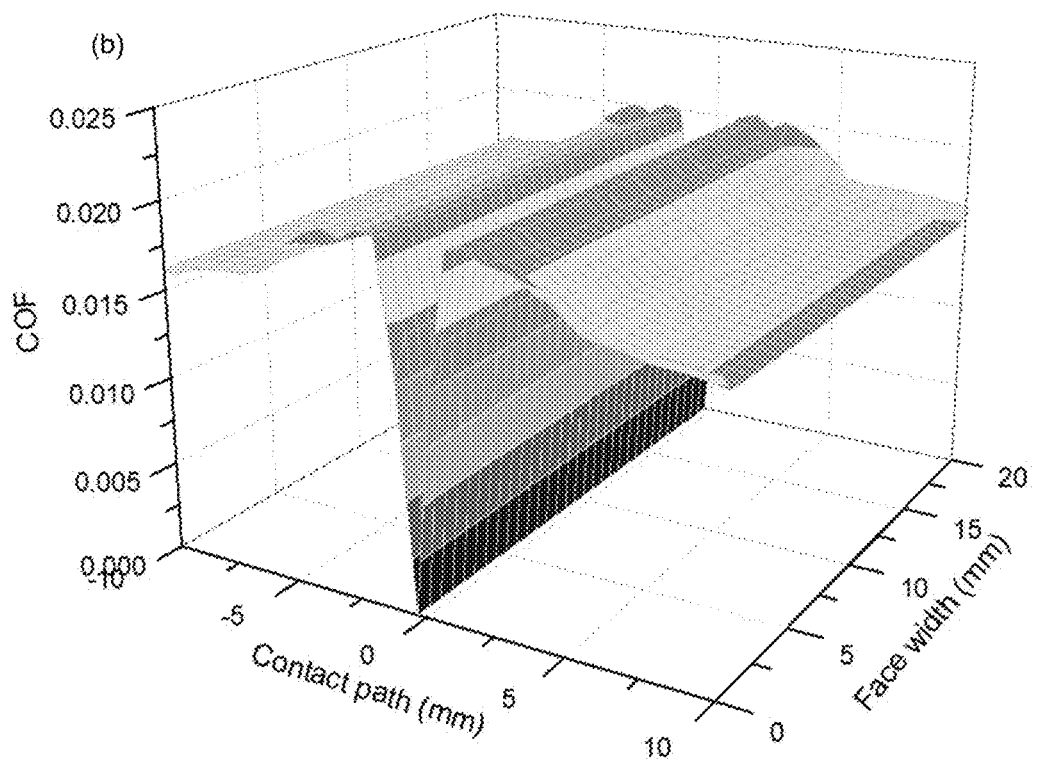
FIG. 6B is a graph of numerical results of coefficient of friction of tooth surfaces of the noncircular gear pair with the modified pitch curve.

Numerical results of COFs of meshing tooth surfaces of the noncircular gear pair with unmodified and modified pitch curves are shown in FIG. 6A and FIG. 6B, respectively. According to EQN. 57, the variable COF of a tooth surface is independent of the position of a contact point, and is relative to the sliding velocity $v_s(i_k,j)$ and entraining velocity $v_e(i_k,j)$ of the contact point of tooth surfaces. Based on numerical results of friction forces of tooth surfaces of the noncircular gear pair with unmodified and modified pitch curves in FIGS. 6A and 6B, the minimum COF of the tooth surface with the unmodified pitch curve is $4.8 \times 10^{-3}$, and that of the tooth surface with modified pitch curve is $1.16 \times 10^{-3}$. The minimum friction forces of tooth surfaces with unmodified and modified pitch curves occur at their pitch points. The maximum COF of the tooth surface with the unmodified pitch curve is 0.02191, and that of the tooth surface with modified pitch curve is 0.01987.

With continued reference to FIG. 6A and FIG. 6B, the minimum COFs of tooth surfaces with unmodified and modified pitch curves occur at pitch curves of noncircular gears. Comprising numerical results of friction forces of tooth surfaces of the noncircular gear pair with unmodified and modified pitch curves, the minimum and the maximum COFs of the tooth surface with the modified pitch curve are smaller than that of the tooth surface with the unmodified pitch curve.

Figure 7A:
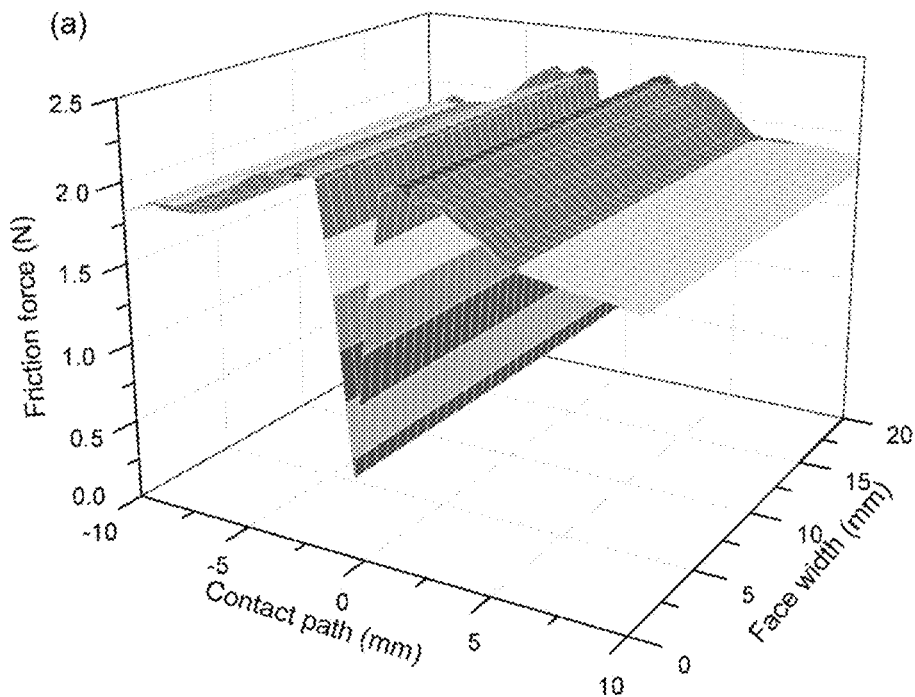
FIG. 7A is a graph of numerical results of friction forces of meshing tooth surfaces of the noncircular gear pair with unmodified pitch curves.
Figure 7B:
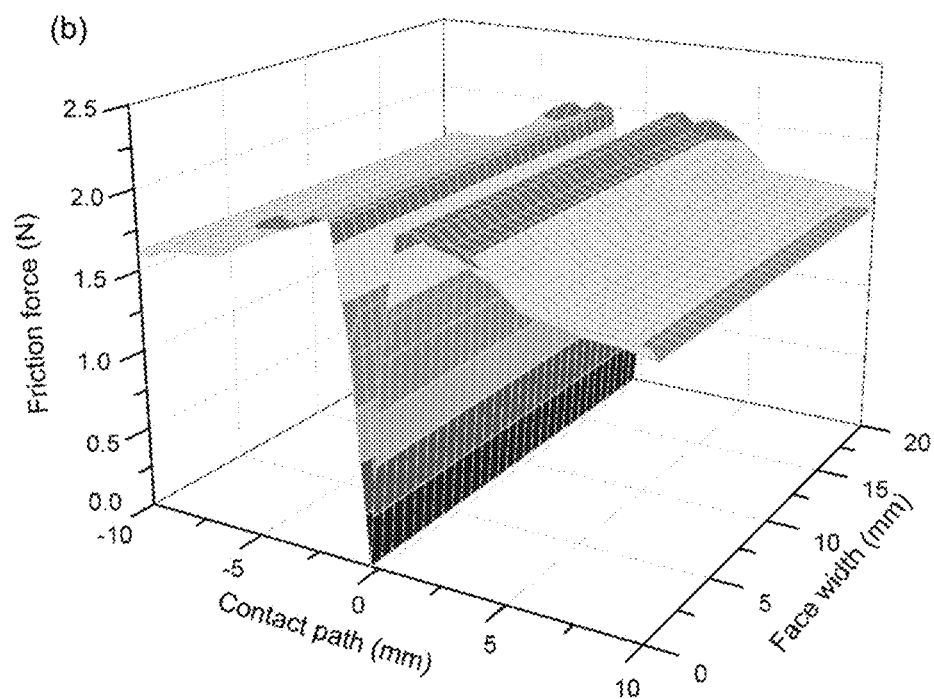
FIG. 7B is a graph of numerical results of friction forces of meshing tooth surfaces of the noncircular gear pair with modified pitch curves.

Based on numerical results of friction forces of meshing tooth surfaces of the noncircular gear pair with unmodified and modified pitch curves in FIG. 7A and FIG. 7B, the minimum friction force of tooth surfaces with the unmodified pitch curve is 0.05 N, and that of tooth surfaces with the modified pitch curve is 0.012 N. The minimum friction forces of tooth surfaces with unmodified and modified pitch curves occur at their pitch points. The maximum friction force of tooth surfaces with the unmodified pitch curve is 2.202 N, and that of tooth surfaces with the modified pitch curve is 1.992 N. By comparing numerical results of friction forces of tooth surfaces of the noncircular gear pair with unmodified and modified pitch curves, the minimum and maximum friction forces of tooth surfaces with the modified pitch curve are smaller than those of tooth surfaces with the unmodified pitch curve, respectively. Modification of high-order pitch curves of noncircular gears can reduce friction forces of meshing tooth surfaces.

Sliding Friction Power Loss: Since sliding friction power loss is determined by the work done by the friction force in a meshing period, meshing time is normalized with respect to a meshing period via a dimensionless variable $t=t/\Delta T$, where $\Delta T$ is the meshing period. By using the dimensionless time $t$, the meshing period $\Delta T$ is equal to 1 and sliding friction power loss of the noncircular gear pair over one meshing period can be represented as $$E_{friction} = \int_{i_k} \int_j \int_0^1 F_m(i_k, j) r(j) w_p di_k dj dt \quad (60)$$

$$= \int_{i_k} \int_j \int_0^1 z(i_k, j) f(i_k, j) f(v_s(i_k, j)) di_k dj dt$$

Figure 8A:
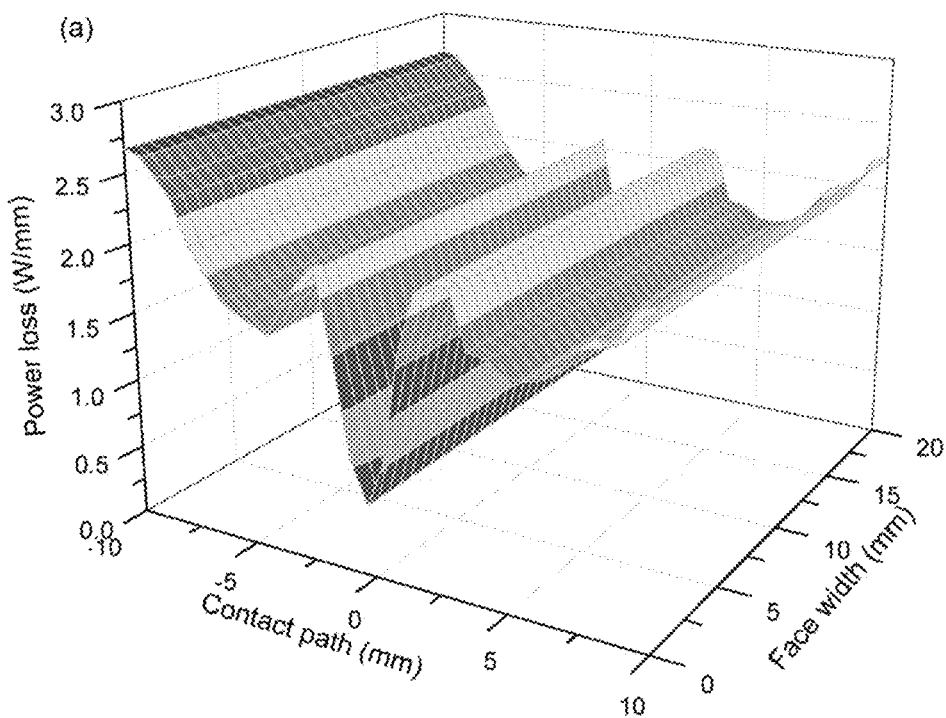
FIG. 8A is a graph of numerical results of sliding friction power losses of the noncircular gear pair with unmodified pitch curves.
Figure 8B:
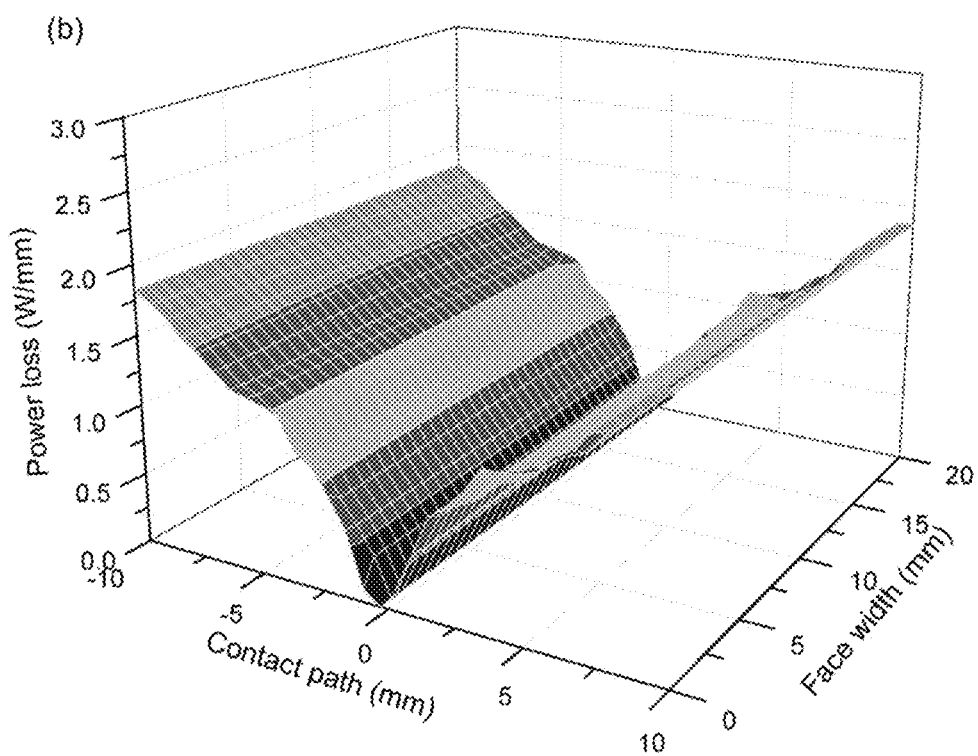
FIG. 8B is a graph of numerical results of sliding friction power losses of the noncircular gear pair with modified pitch curves.

Numerical results of sliding friction power losses of meshing tooth surfaces of NG1 and NG2 with unmodified and modified pitch curves are shown in FIG. 8A and FIG. 8B, respectively. According to EQN. 60, sliding friction power losses of meshing tooth surfaces depend on COFs, the normal load, and sliding velocities at a contact point of tooth surfaces of NG1 and NG2. The maximum sliding friction power losses of tooth surfaces with unmodified and modified pitch curves occur at dedenda of tooth surfaces. Sliding velocities at dedenda of tooth surfaces are larger than those at the pitch point of the tooth surface of NG1. Contact stresses at the dedendum of NG1 are also larger than those at the pitch point of its tooth surface. Larger friction forces with larger sliding velocities mean more sliding friction power loss at dedenda of tooth surfaces of NG1 and NG2.

The minimum sliding friction power losses of meshing tooth surfaces with unmodified and modified pitch curves occur at the pitch point of tooth surfaces. The maximum and minimum sliding friction power losses of the tooth surface with the modified pitch curve are 1.772 W/mm and 0.003 W/mm, respectively, which are smaller than those of the tooth surface with the unmodified pitch curve, respectively. The maximum sliding friction power loss of the tooth surface with the unmodified pitch curve is 2.713 W/mm, and that of the tooth surface with the modified pitch curve decreases by 0.941 W/mm. The minimum sliding friction power loss of the tooth surface with the unmodified pitch curve is 0.481 W/mm, and that of the tooth surface with the modified pitch curve decreases by 0.478 W/mm. The average sliding friction power losses of tooth surfaces of NG1 and NG2 are significantly reduced due to modification of high-order pitch curves of noncircular gears.

6. Methods and Systems

The present disclosure provides a noncircular gear design method with a modified high-order elliptical pitch curve for the IVT to improve smoothness of pitch curves and manufacturability of noncircular gears. Modified high-order elliptical pitch curves of noncircular gears are designed based on kinematic equations of the IVT. Sliding friction power losses of the noncircular gear pair with unmodified and modified pitch curves are evaluated by incorporating load-dependent friction forces and sliding velocities. Based on numerical results obtained, some meaningful conclusions include: (1) The proposed noncircular gear design method can in principle be used for determining proper meshing performance of gear transmissions with noncircular gears. Although examples detailed herein are associated with investigation of the IVT, the method can be used for noncircular gears in other types of gear transmissions. (2) Noncircular gears with high-order elliptical pitch curves can be fabricated and modified by using a shaping cutter. Modification of high-order elliptical pitch curves can guarantee positive convexities of the whole high-order elliptical pitch curves and eliminate cusps between every two neighboring lobes of high-order elliptical pitch curves. (3) Sliding friction power losses of meshing tooth surfaces of noncircular gears can be estimated based on sliding velocities and friction forces of tooth surfaces. Numerical analysis results show that modification of high-order elliptical pitch curves can reduce sliding friction power losses of tooth surfaces.

Figure 9:
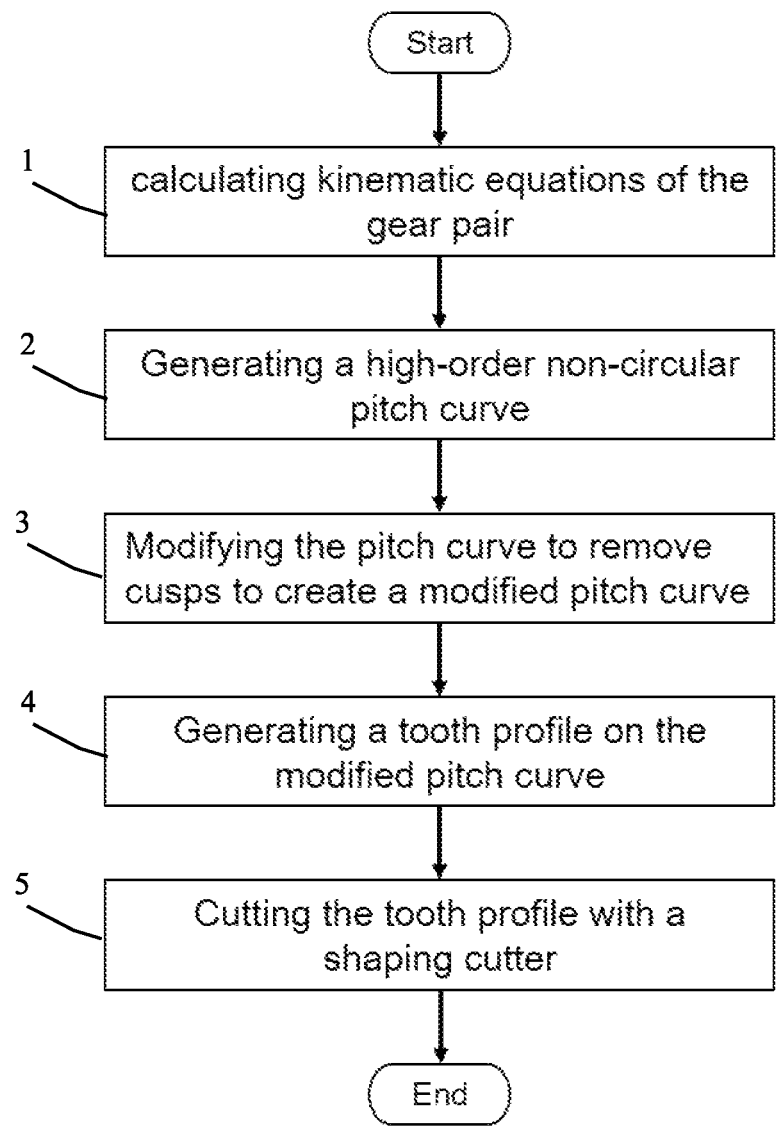
FIG. 9 is a flowchart of a method of manufacturing a gear pair.

With reference to FIG. 9, the present disclosure includes a method of manufacturing a noncircular gear pair including the steps of calculating kinematic equations of the gear pair (STEP 1); generating a high-order non-circular pitch curve based on the kinematic equations (STEP 2) and modifying the pitch curve to remove cusps and to create a modified pitch curve (STEP 3). The method further includes generating a tooth profile on the modified pitch curve (STEP 4); and cutting the tooth profile with a shaping cutter (STEP 5). As such, the present disclosure provides a comprehensive design process to determine optimized noncircular pitch curves based on, among other things, the motion relationship of the transmission.

The systems and methods described herein can be implemented in hardware, software, firmware, or combinations of hardware, software and/or firmware. In some examples, the systems and methods described in this specification may be implemented using a non-transitory computer readable medium storing computer executable instructions that when executed by one or more processors of a computer cause the computer to perform operations. Computer readable media suitable for implementing the systems and methods described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a system or method described in this specification may be located on a single device or computing platform or may be distributed across multiple devices or computing platforms.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

It will be readily apparent to those skilled in the art that other suitable modifications and adaptations of the methods of the present disclosure described herein are readily applicable and appreciable, and may be made using suitable equivalents without departing from the scope of the present disclosure or the aspects and embodiments disclosed herein. Having now described the present disclosure in detail, the same will be more clearly understood by reference to the following examples, which are merely intended only to illustrate some aspects and embodiments of the disclosure, and should not be viewed as limiting to the scope of the disclosure. The disclosures of all journal references, U.S. patents, and publications referred to herein are hereby incorporated by reference in their entireties.

It is understood that the foregoing detailed description and accompanying examples are merely illustrative and are not to be taken as limitations upon the scope of the disclosure, which is defined solely by the appended claims and their equivalents.

Various changes and modifications to the disclosed embodiments will be apparent to those skilled in the art.

What is claimed is:

1. A noncircular gear comprising:
   a pitch curve having
   a first elliptical portion relating to a first ellipse;
   a second elliptical portion relating to a second ellipse, different than the first ellipse; and
   a modified transition portion positioned between the first elliptical portion and the second elliptical portion; and
   wherein the pitch curve includes no cusps; and
   wherein an eccentricity of each of the first elliptical portion and the second elliptical portion is within a range of 0.1 to 0.9.

2. The noncircular gear of claim 1, wherein the modified transition portion is a first modified transition portion and the pitch curve further comprises a third elliptical portion relating to a third ellipse, different than the first ellipse and the second ellipse, and a second modified transition portion positioned between the second elliptical portion and the third elliptical portion.

3. The noncircular gear of claim 2, wherein the pitch curve further comprises a fourth elliptical portion relating to a fourth ellipse.

4. The noncircular gear of claim 3, wherein the pitch curve further comprises a fifth elliptical portion relating to a fifth ellipse and a sixth elliptical portion relating to a sixth ellipse.

5. The noncircular gear of claim 1, wherein the eccentricity of each of the first elliptical portion and the second elliptical portion is within a range of 0.1 to 0.3.

6. The noncircular gear of claim 5, wherein the eccentricity of each of the first elliptical portion and the second elliptical portion is 0.15.

7. The noncircular gear of claim 1, wherein a curvature of the pitch curve is positive along the entire pitch curve.

8. The noncircular gear of claim 1, wherein the noncircular gear is manufacturable with a shaping cutter with a constant radius.

9. The noncircular gear of claim 1, further including a plurality of teeth.

10. A method of manufacturing a non-circular gear pair, the method comprising:
    calculating kinematic equations of the non-circular gear pair;
    generating a non-circular pitch curve including a plurality of lobes based on the kinematic equations;
    modifying the non-circular pitch curve to remove cusps to create a modified pitch curve; wherein the modified pitch curve includes a first elliptical portion relating to a first ellipse, a second elliptical portion relating to a second ellipse, different than the first ellipse, and a modified transition portion positioned between the first elliptical portion and the second elliptical portion;
    generating a tooth profile based on the modified pitch curve; and
    cutting the tooth profile with a shaping cutter having a constant radius.

11. The noncircular gear of claim 1, wherein the first elliptical portion is the same shape as the second elliptical portion.

12. The noncircular gear of claim 3, wherein the first elliptical portion, the second elliptical portion, the third elliptical portion, and the fourth elliptical portion are the same shape.

* * * * *